US011429906B2

(12) United States Patent
Suri et al.

(10) Patent No.: US 11,429,906 B2
(45) Date of Patent: Aug. 30, 2022

(54) PROFILING OF USERS' BEHAVIOR AND COMMUNICATION IN BUSINESS PROCESSES

(71) Applicant: Conduent Business Services, LLC, Dallas, TX (US)

(72) Inventors: Kunal Suri, Palaiseau (FR); Scott Peter Nowson, Grenoble (FR); Adrian Corneliu Mos, Meylan (FR)

(73) Assignee: Conduent Business Services, LLC, Florham Park, NJ (US)

( * ) Notice: Subject to any disclaimer, the term of this patent is extended or adjusted under 35 U.S.C. 154(b) by 1611 days.

(21) Appl. No.: 15/184,042

(22) Filed: Jun. 16, 2016

(65) Prior Publication Data

US 2017/0364857 A1 Dec. 21, 2017

(51) Int. Cl.
*G06Q 10/00* (2012.01)
*G06Q 10/06* (2012.01)

(52) U.S. Cl.
CPC ... *G06Q 10/063114* (2013.01); *G06Q 10/067* (2013.01); *G06Q 10/0631* (2013.01); *G06Q 10/0639* (2013.01); *G06Q 10/06311* (2013.01); *G06Q 10/06312* (2013.01); *G06Q 10/06315* (2013.01); *G06Q 10/06393* (2013.01)

(58) Field of Classification Search
USPC ...................................................... 705/7.15
See application file for complete search history.

(56) References Cited

U.S. PATENT DOCUMENTS

| 6,236,975 | B1 | 5/2001 | Boe et al. |
| 6,571,216 | B1 | 5/2003 | Garg et al. |
| 7,603,331 | B2 | 10/2009 | Tuzhilin et al. |
| 7,657,907 | B2 | 2/2010 | Fennan et al. |
| 7,765,166 | B2 | 7/2010 | Beringer et al. |
| 7,899,786 | B2 | 3/2011 | Arellano |
| 9,043,407 | B1 | 5/2015 | Gaulke et al. |

(Continued)

FOREIGN PATENT DOCUMENTS

WO    WO 2008/042242 A2    4/2008

OTHER PUBLICATIONS

Liu, Yung, Extracting Patient Demographics and Personal Medical Information from Online Health Forums, 2014, College of Computer Sciences, NJIT, https://www.ncbi.nlm.nih.gov/pmc/articles/PMC4419981/, p. 1-10 (Year: 2014).*

(Continued)

*Primary Examiner* — Joseph M Waesco
(74) *Attorney, Agent, or Firm* — Fay Sharpe LLP

(57) ABSTRACT

A computer-implemented user profiling system includes a human communication retrieval component which, for an entity employing a business process management system, captures communication data in response to a given business process being implemented by the business process management system. A human task monitoring and contextual analysis component captures user behavior information associated with the business process. A profile analysis engine is also included, which receives the user behavior information and communication data and updates a user profile corresponding to at least one of the users, based on the user behavior information and communication data.

20 Claims, 16 Drawing Sheets

(56) References Cited

U.S. PATENT DOCUMENTS

| | | | |
|---|---|---|---|
| 2014/0196020 A1 | 7/2014 | Shetty et al. | |
| 2014/0229412 A1* | 8/2014 | Gupta | H04L 67/306 706/20 |
| 2014/0236663 A1* | 8/2014 | Smith | G06Q 10/0633 705/7.27 |
| 2015/0006448 A1* | 1/2015 | Gupta | G06Q 10/063114 706/12 |
| 2015/0046212 A1 | 2/2015 | Mos | |
| 2015/0106078 A1* | 4/2015 | Chang | G06F 16/35 704/9 |
| 2015/0106156 A1* | 4/2015 | Chang | G06Q 30/0201 705/7.29 |
| 2015/0106157 A1* | 4/2015 | Chang | G06F 40/237 705/7.29 |
| 2015/0294426 A1 | 10/2015 | Nezhad | |
| 2016/0132788 A1* | 5/2016 | Li | G06Q 50/01 706/12 |
| 2016/0162816 A1* | 6/2016 | Suri | G06Q 10/0633 705/7.27 |
| 2016/0203221 A1* | 7/2016 | Rao | G06Q 50/01 707/707 |
| 2017/0300472 A1* | 10/2017 | Parikh | H04L 51/046 |
| 2017/0364857 A1* | 12/2017 | Suri | G06Q 10/0639 |
| 2019/0156206 A1* | 5/2019 | Graham | G06N 3/0454 |
| 2019/0156210 A1* | 5/2019 | He | G06N 3/0427 |
| 2019/0205382 A1* | 7/2019 | Raux | G06F 40/30 |
| 2022/0012076 A1* | 1/2022 | Natarajan | G06N 3/006 |

OTHER PUBLICATIONS

U.S. Appl. No. 14/560,293, Dec. 4, 2014, Kunal Suri, et al.
U.S. Appl. No. 14/845,528, Sep. 4, 2015, Scott Nowson, et al.
Friedrich, et al., "Process Model Generation from Natural Language Text," CAiSE 2011, vol. 6741 of LNCS, pp. 482-496, 2011.
Pittke, et al., "Enabling reuse of process models through the detection of similar process parts," 3rd Int'l Workshop on Reuse in Business Process Management, pp. 1-12 (2012).
Mirkin, et al., "Motivating Personality-aware Machine Translation," Proc. Conf. on Empirical Methods in Natural Language (EMNLP) pp. 1102-1108 (2015).
Nowson, et al., "XRCE Personal Language Analytics Engine for Multilingual Author Profiling—Notebook for PAN at CLEF 2015," CLEF 2015 Labs and Workshops, Notebook Papers (CEUR-WS. org) pp. 1-12 (2015).
Nowson, et al., "Weblogs, Genres and Individual Differences," Proc. 27th Annual Conf. of the Cognitive Science Society, pp. 1666-1671 (2005).
IBM Bluework Live, A collaborative business process modeling tool, pp. 1-3, downloaded on May 2, 2016 from: https://www.blueworkslive.com/.
Tibco Nimbus, A process documentation application, pp. 1-4, downloaded on May 2, 2016, from: http://www.tibco.com/products/automation/business-process-management/nimbus.

* cited by examiner

PROFILING OF USERS' BEHAVIOR AND COMMUNICATION IN BUSINESS PROCESSES

BACKGROUND

The exemplary embodiment relates to business process management and finds particular application in a system and method for user profiling.

Business Process Management (BPM) is widely used for enterprise solution environments as it enables organizations to design or update business applications depending on the market requirements. BPM suites are complex software stacks that execute business activities and connect them to various enterprise resources, which can include legacy applications and the organization's Service Oriented Architecture (SOA). Any organization making use of such BPM tools needs to monitor the execution of their processes to keep track on outcomes. Thus, it is desirable for organizations to provide continuous monitoring of process execution, together with measuring the process output with pre-defined key performance indicators (KPI's).

A business process that delivers value to its end user typically covers two types of activities: first, a manual/user activity which is performed by human actor; and second, an automated activity which is performed by web services or other automated systems. Conventional business process monitoring approaches focus on monitoring the execution details of processes and activities. Most existing approaches tie together execution details for various business process elements and then try to identify any bottlenecks. This monitoring method does not consider process semantics based on its domain and other components, such as web services involved during completion of these business processes. Mechanisms have been proposed for creating and monitoring domain specific business processes and their underlying web-services with monitoring capabilities that also analyze user work patterns in the context of the user's workload. Such systems retrieve execution details, such as start time, stop time and workload on a user from their work list. Monitoring systems for domain-specific business processes which are capable of monitoring the execution of both manual and automated activities using the notion of a concept probe have also been developed. Such monitoring systems are able to co-relate the workload on users and explain the execution pattern of manual activities in relation to the user workload.

Other human actions involved in a business process are not generally considered in such approaches. Human actions or communication data typically generated in a business process may include textual communications, for example writing a comment while starting a process or starting an activity; generating comments while completing an activity or process; and messages exchanged while approving, rejecting or asking for more information. Typical human actions in a business process may also involve user behavior/patterns, such as time taken for responding to a message and user schedules or patterns (e.g., if a user replies to emails during a fixed time-frame in a day, etc.).

The combination of text analysis and natural language processing (NLP) with business process management (BPM) has been studied for some applications. For example, in F. Friedrich, et al., "Process Model Generation from Natural Language Text", CAiSE 2011, Vol. 6741 of LNCS, Springer, pp. 482-496, 2011, NLP techniques are used to create business processes using natural language text. In J. M. Fabian Pittke, et al., "Enabling reuse of process models through the detection of similar process parts", 3rd Int'l Workshop on Reuse in Business Process Management, 2012, NLP techniques are used to find similarity between different processes.

There remains a need for a user profiling system that can make use of data generated during activities performed by users while working on a business process running in an organization, and in particular, the creation of user profiles for both internal users (agents) and external users (customers) of the organization for both generic business processes and domain-specific business processes. Particularly, a framework is desired which retrieves the textual communication exchanged in a BPM system and which uses this communication data, along with user behavior information, to build a user profile.

INCORPORATION BY REFERENCE

The following references, the disclosures of which are incorporated herein by reference, are mentioned:

U.S. Pub. No. 20150046212, published Feb. 12, 2015, entitled "MONITORING BUSINESS PROCESSES AND SERVICES USING CONCEPT PROBES AND BUSINESS PROCESS PROBES," by Adrian C. Mos.

U.S. application. Ser. No. 14/560,293, entitled "HUMAN TASK MONITORING AND CONTEXTUAL ANALYSIS FOR DOMAIN-SPECIFIC BUSINESS PROCESSES", filed Dec. 4, 2014, by Kunal Suri, et al.

U.S. Pat. No. 9,043,407, issued May 26, 2015, entitled INTERACTIVE USER INTERFACE TO COMMUNICATION-ENABLED BUSINESS PROCESS PLATFORMS METHOD AND APPARATUS, by Gaulke, et al.

U.S. Pat. No. 7,765,166, issued Jul. 27, 2010, entitled COMPILING USER PROFILE INFORMATION FROM MULTIPLE SOURCES, by Beringer, et al.

U.S. Pat. No. 6,571,216, published May 27, 2003, entitled DIFFERENTIAL REWARDS WITH DYNAMIC USER PROFILING, by Garg et al.

U.S. Pat. No. 7,603,331, issued Oct. 13, 2009, entitled SYSTEM AND METHOD FOR DYNAMIC PROFILING OF USERS IN ONE-TO-ONE APPLICATIONS AND FOR VALIDATING USER RULES, by Tuzhilin, et al.

U.S. Pat. No. 7,657,907, issued Feb. 2, 2010, entitled AUTOMATIC USER PROFILING, by Fennan, et al., U.S. Pat. No. 7,899,786, issued Mar. 1, 2011, entitled METHOD AND SYSTEM FOR DISTRIBUTED USER PROFILING, by Arellano.

U.S. Pat. No. 6,236,975, issued May 22, 2001, entitled SYSTEM AND METHOD FOR PROFILING CUSTOMERS FOR TARGETED MARKETING, by Boe, et al.

BRIEF DESCRIPTION

In accordance with one aspect of the exemplary embodiment, a computer-implemented user profiling system includes a human communication retrieval component which, for an entity employing a business process management system, captures communication data in response to a given business process being implemented by the business process management system, the human communication retrieval component retrieving communication data from users associated with the given business process. A profile analysis engine receives the retrieved communication data and updates a user profile corresponding to at least one of the users, based on the captured communication data. A processor implements the human communication retrieval component and profile analysis engine.

In accordance with another aspect of the exemplary embodiment, a computer-implemented method of user profiling includes monitoring a business process of a business process management system employed by users of an entity. Communication data is retrieved for at least one of the users associated with the monitored business process. A user profile corresponding to at least one of the users is updated, based on the communication data.

At least one of the monitoring, retrieving and updating may be performed with a computer processor.

In accordance with another aspect of the exemplary embodiment, a computer-implemented user profiling system includes a profile analysis engine, the profile analysis engine being communicatively connected to a human communication retrieval component and also being communicatively connected to a human task monitoring and contextual analysis component. Each of the profile analysis engine, the human communication retrieval component, and the human task monitoring and contextual analysis component is communicatively connected to a monitoring component of an associated business process management system. In response to a given business process being implemented by the business process management system, the monitoring component alerts the profile analysis engine, the human task monitoring and contextual analysis component captures user behavior information associated with at least one activity of the business process, and the human communication retrieval component captures communication data associated with the at least one activity. In response to receiving the user behavior information from the human task monitoring and contextual analysis component and the communication data from the human communication retrieval component, the profile analysis engine updates a user profile based on the user behavior information and communication data. A processor implements the profile analysis engine, the human task monitoring and contextual analysis component and the human communication retrieval component.

DETAILED DESCRIPTION

A monitoring system for business processes captures textual communications being exchanged between various users for user profiling and modeling.

Figure 1A:
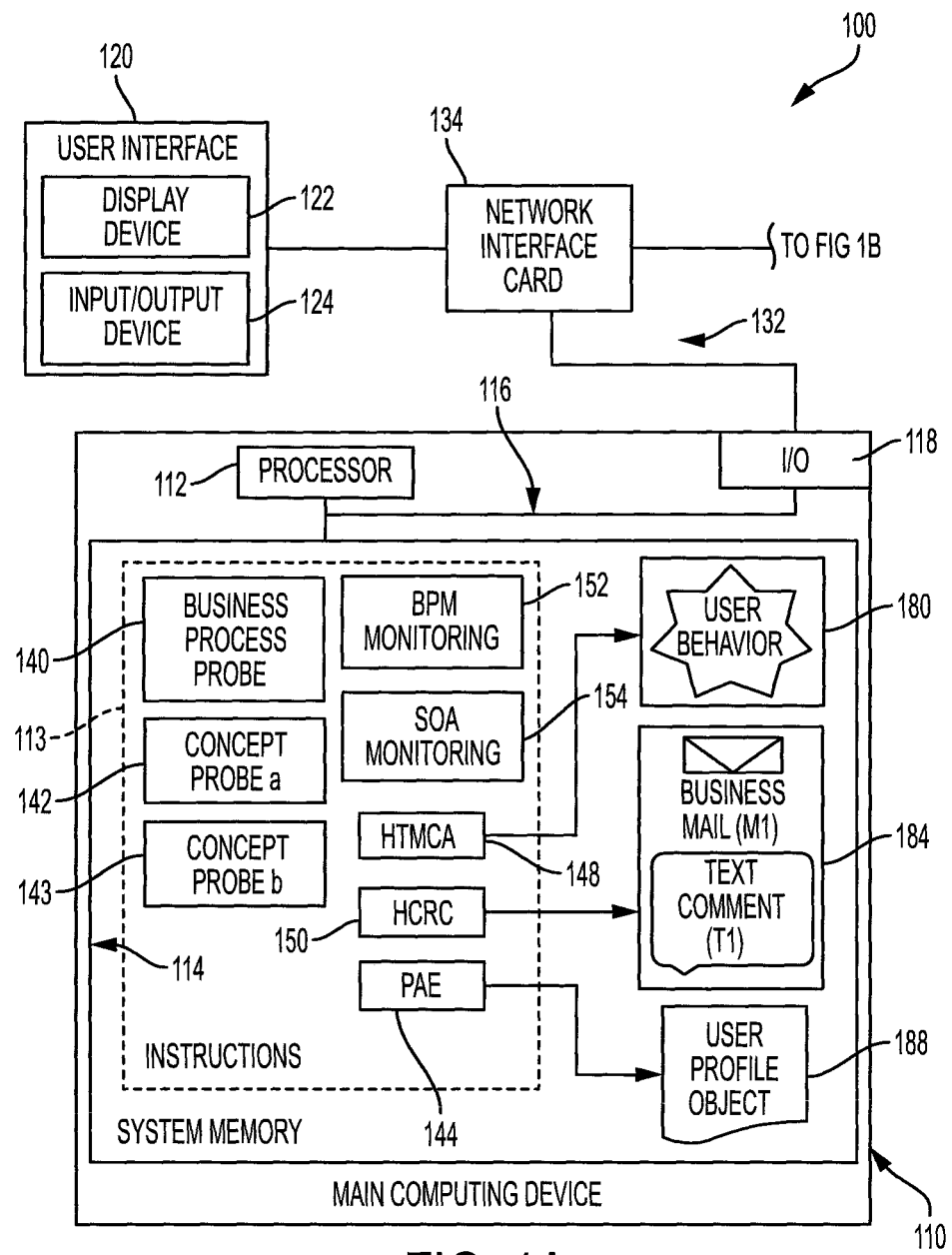
FIG. 1, which is split into FIG. 1A and FIG. 1B for ease of illustration, is a functional block diagram of a user profiling system, in accordance with one aspect of the exemplary embodiment.
Figure 1B:
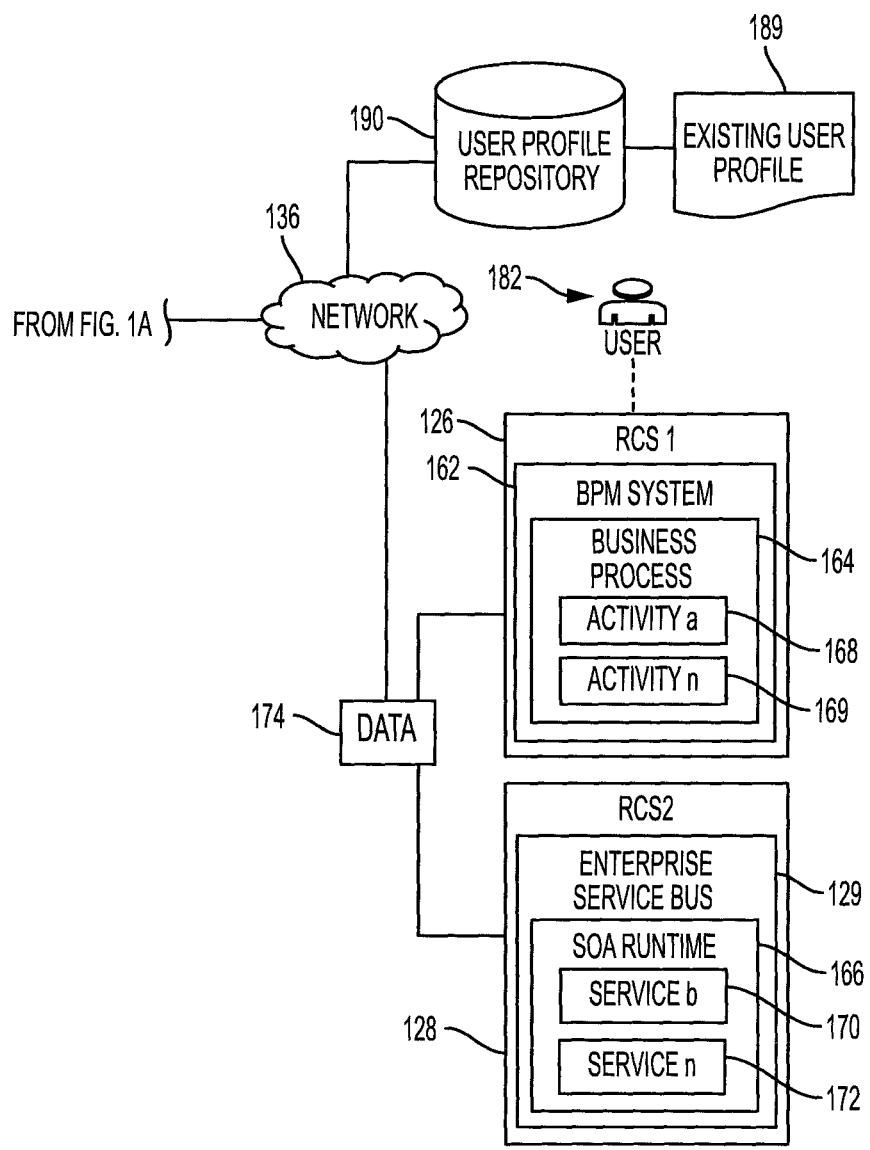

FIG. 1 (split into FIG. 1A and FIG. 1B) is a functional block diagram of a computer implemented user profiling system 100 suitable for performing the exemplary method disclosed herein. The system performs user profiling by making use of the data generated from business processes related to a user's behavior and user's soft-skills. The exemplary user profiles take into account the exchanged communication data between various users participating in a business process, together with data about user actions or behavior. In particular, a human communication retrieval component ("HCRC") 150 is responsible for keeping track of all the textual information (e.g., textual comments, emails, text messages, OCRed voice recordings, etc.) exchanged between various users which relate to a specific activity in a specific business process. The user behavior information (e.g., how a user works in context of his workload) is obtained through the use of a human task monitoring and contextual analysis (HTMCA) component 148. The communication data and user behavior information are fed into a profile analysis engine ("PAE") 144, which provides a user profile.

The exemplary HCRC 150, HTMCA component 148, and PAE 144 of FIG. 1A utilize data generated from a business process management ("BPM") system 162 and service oriented architecture ("SOA") 166 shown in FIG. 1B. The data is generated by users performing activities associated with a business process running in an organization employing the BPM system 162. A business process probe 140, concept probes 142, 143, human task monitoring and contextual analysis ("HTMCA") component 148, business process monitoring component 152, and SOA monitoring component 154 aid in the collection of this data. The BPM system 162, SOA 166, business process probe 140, concept probes 142, 143, HTMCA component 148, business process monitoring component 152, and SOA monitoring component 154 are all described in greater detail in above-mentioned U.S. Pub. No. 2015/0046212, and U.S. application Ser. No. 14/560,293, incorporated herein by reference. The present system may be used in a system as described, for example, in U.S. Pub. No. 2015/0046212 and/or U.S. application Ser. No. 14/560,293 to include user profiling.

As will be appreciated, separate computer systems may be configured and connected for monitoring and for running individual services, activities, and processes. The illustrated user profiling system 100 includes a main computing device 110 including a processor 112, which controls the overall operation of the computing device 110 by execution of processing instructions 113, which are stored in a memory 114 connected to the processor 112 by a bus 116. The processor 112 also executes instructions 117, stored in memory 114, for performing the exemplary method outlined in FIG. 2.

The user profiling system 100 may include multiple processors 112, wherein each processor is allocated to processing particular (sets of) instructions. User profiling system 100 also includes one or more interfaces to connect the main computing device 110 to external devices, including an input output (I/O) interface 118. The I/O interface may communicate with a user interface 120. The user interface 120 may include one or more of a display device 122, for displaying information to users, such as an LCD screen, and a user input device 124, such as a keyboard or touch or writable screen, and/or a cursor control device, such as a mouse, trackball, or the like, for inputting instructions and communicating user input information and command selections to the processor. The I/O 118 also links the computing device 110 with external devices, such as the illustrated remote computing systems 126, 128 via wired or wireless links 132. For example, I/O 118 may include or communicate with a network interface card (NIC) 134 which is in turn connected to a network 136, which links the main computing device to computing systems 126, 128.

Memory 114 may store instructions 117 for executing various software components, such as the business process probe 140, a plurality of concept probes 142, 143, the PAE 144, the HTMCA component 148, the HCRC 150, a business process monitoring component 152, and SOA monitoring component 154. These components may in turn be composed of other components, explained further below.

The main computing device 110 may include a PC, such as a desktop, a laptop, palmtop computer, portable digital assistant (PDA), server computer, cellular telephone, pager, or other computing device or devices capable of executing instructions for performing the exemplary method or methods described herein.

The memory 114 may be separate or combined and may each represent any type of non-transitory computer readable medium, such as random access memory (RAM), read only memory (ROM), magnetic disk or tape, optical disk, flash memory, or holographic memory. In one embodiment, the memory 114 comprises a combination of random access memory and read only memory. In some embodiments, the processor 112 and memory 114 may be combined in a single chip.

The I/O interface 118 communicates with other devices via computer network 136, such as a local area network (LAN), a wide area network (WAN), or the Internet, and may comprise a modulator/demodulator (MODEM). The digital processor 112 can be variously embodied, such as by a single core processor, a dual core processor (or more generally by a multiple core processor), a digital processor and cooperating math coprocessor, a digital controller, or the like.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on the server or other location to perform certain functions.

As shown in FIG. 1, one or more remote computing systems 126, 128, which may be separate or combined, may be similarly configured to the main computing device 110, i.e., may include memory and a processor. Likewise, the PAE 144, HTMCA component 148, and HCRC 150 may be executed on remote computing systems similarly configured to the main computing device 110, i.e., may include memory and a processor.

A first remote computing system ("RCS1") 126 may provide access to a BPM system 162 which implements a business process 164 defined by a business process description. One or more activities 168, 169, can be associated with the business process 164. The BPM system 162 may include an execution engine for executing Business Process Execution Language (BPEL) scripts, or another type of runtime engine. A second remote computing system ("RCS2") 128 may provide access to a Service Oriented Architecture 166 which provides the BPM system processes with access to services that execute the business process. One or more services 170, 172 can be associated with the SOA 166. One of the activities 168, 169 may be a manual activity (i.e., not attached to any service), while the other activity can be automated (i.e., attach to one of services 170, 172). The BPM system 162 and SOA 166 generate data 174 which is monitored by the business process monitoring component 152 and the SOA monitoring component 154 via network 136.

The concept probes 142, 143 may be configured to interface with the HTMCA component 148 and the business process monitoring component 152 for activity data collection from data 174. Likewise, for SOA data collection, the concept probes can connect to the SOA monitoring/runtime layer 154 using, for example, a specific Enterprise Service Bus 129 at RCS2 128 to collect metrics of interest from data 174. The concept probes match the business concepts used in the definition of the business activities which form the business processes. The concept probes combine monitoring information from the monitoring data 174 generated as a result of the business process execution as well as service execution into aggregated information that is informative from a business concept point of view. In addition to the concept probes 142, 143, a business process probe 140 can exchange information with the concept probes to aggregate business process information.

User profiling is performed by the PAE 144, which relies on the HTMCA component 148 and the HCRC 150 to retrieve information from the data 174 generated by the BPM system 162. The business process monitoring component 152 alerts the PAE 144 that a given business process is being implemented by the BPM system 162 so that the PAE can begin the user profiling. The PAE 144 queries the HTMCA component 148 to retrieve information from the automated monitoring data 174 about the human users which may be involved in activities 168, 169 of the business process. The concept probe 142 can be utilized to interrogate the HTMCA component 148 for this information. For example, the concept probe 142 can gather and correlate execution details of activity "a" 168 so that this information is specifically bound to the business concept "a." The information retrieved by the HTMCA component 148 can be user behavior information 180, which includes knowledge about users involved in the business process 164 and the roles associated to each business process activity 168, 168. The user behavior information 180 also includes data which is directly generated by the users involved in the business process 164. For example, when a User 182 in an assigned role works on an activity 168, 169, the user behavior information 180 details user action data, e.g., how a user completes a task that is internal to his team versus how a user works on a task external to his team, activity execution details, process execution details, etc., all of which is generated from use of the BPM system 162. Activity execution details provide information such as activity name, start time, end time, etc. and the like, along with details such as, 'to which process this activity belongs', 'which user started it', 'which other activities are being worked on by the user', etc. and the like.

After querying the HTMCA component 148, the PAE 144 signals the HCRC 150 to begin capturing communication data from the users associated with the given business process. In other words, the HCRC 150 retrieves communication data 184 from the business process monitoring component 152 in response to the BPM system 162 deploying the business process 164. The concept probe 142 can be utilized to interrogate the business process monitoring component 152 for this information. For example, the concept probe 142 can gather and correlate communication data from activity "a" 168 so that this data is specifically bound to the business concept "a." In particular, the HCRC 150 captures communication data 184 from users associated with the business process 164, such as when User 182 works on activities 168, 169. Communication data 184 is generally unstructured data, such as the text messages/comments and emails exchanged by one or more users as they complete one or more activities. This communication data may be generated, for example, when a user writes comments while starting a process or activity, writes comments while completing an activity or process, or writes emails which are exchanged while approving, rejecting, or asking for more information as a result of the process or activity. The communication data 184 can also be parsed by the HCRC 150 to facilitate subsequent processing by the PAE 144. The communication data 184 provides insight into the way a given user communicates in relation to their behavior information, which is retrieved by the HTMCA component 148.

The PAE 144 receives the communication data 184 retrieved by the HCRC 150 and the user behavior information 180 retrieved by the HTMCA 148. The PAE 144 processes the communication data 184 and the user behavior information 180, which may include feature extraction and classification based on personality attributes. Based on this processed information, the PAE 144 generates a user profile object 188 corresponding to at least one of the users associated with a given business process. The PAE 144 then outputs the user profile object 188, which can be stored in a user profile repository 190 as a new profile. Alternatively, the user profile object 188 can be output to the user profile repository 190 to update or enrich an existing user profile 189 stored in the repository. In this regard, the user profile repository 190 is in communication with the PAE 144 via network 136. The user profiles in turn enable an organization to get a better picture of its operational landscape involving various departments, roles and multiple users.

This exemplary user profiling system and method are advantageously product independent, and thus can easily be used with most of the commercially-available BPM systems. Furthermore, the exemplary monitoring system can make use of application programming interfaces ("APIs") of standard BPM tools in order to retrieve the data required for creating the exemplary user profiles.

Figure 2A:
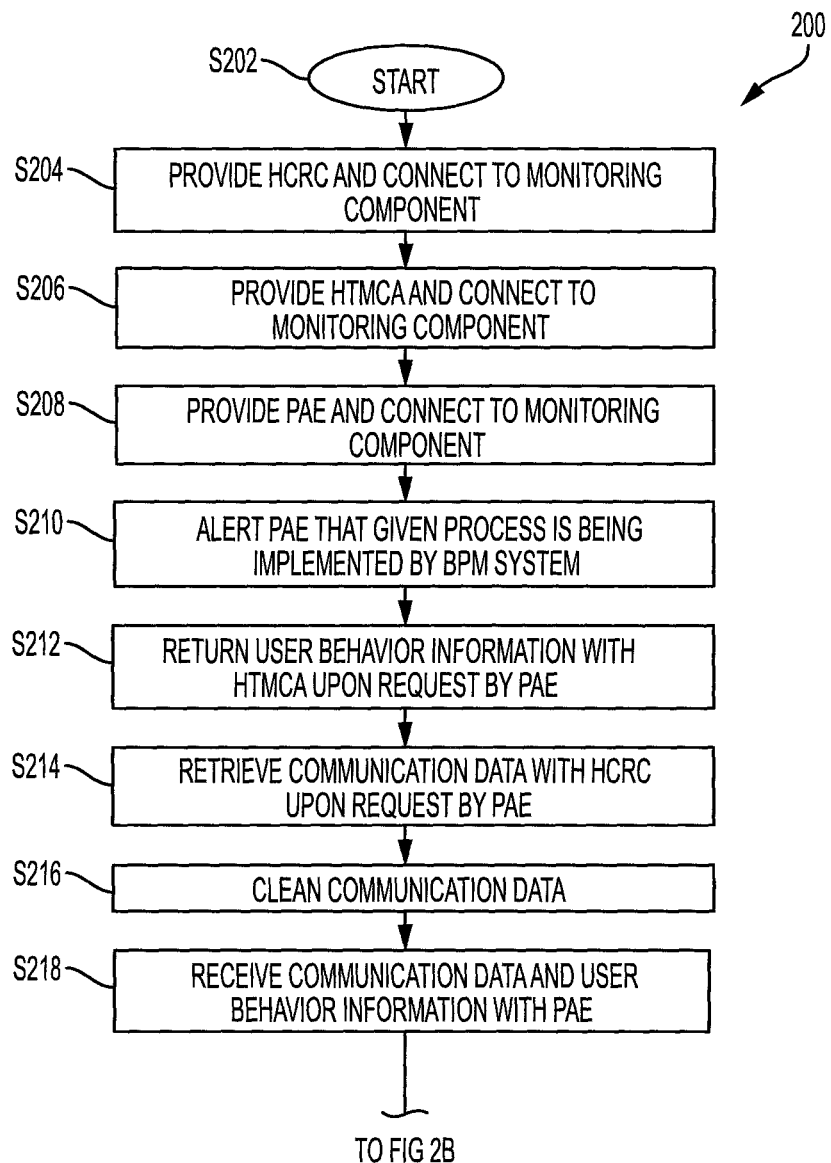
FIG. 2, which is split into FIG. 2A and FIG. 2B for ease of illustration, is a flowchart illustrating a method of monitoring a business process for user profiling in accordance with another aspect of the exemplary embodiment.
Figure 2B:
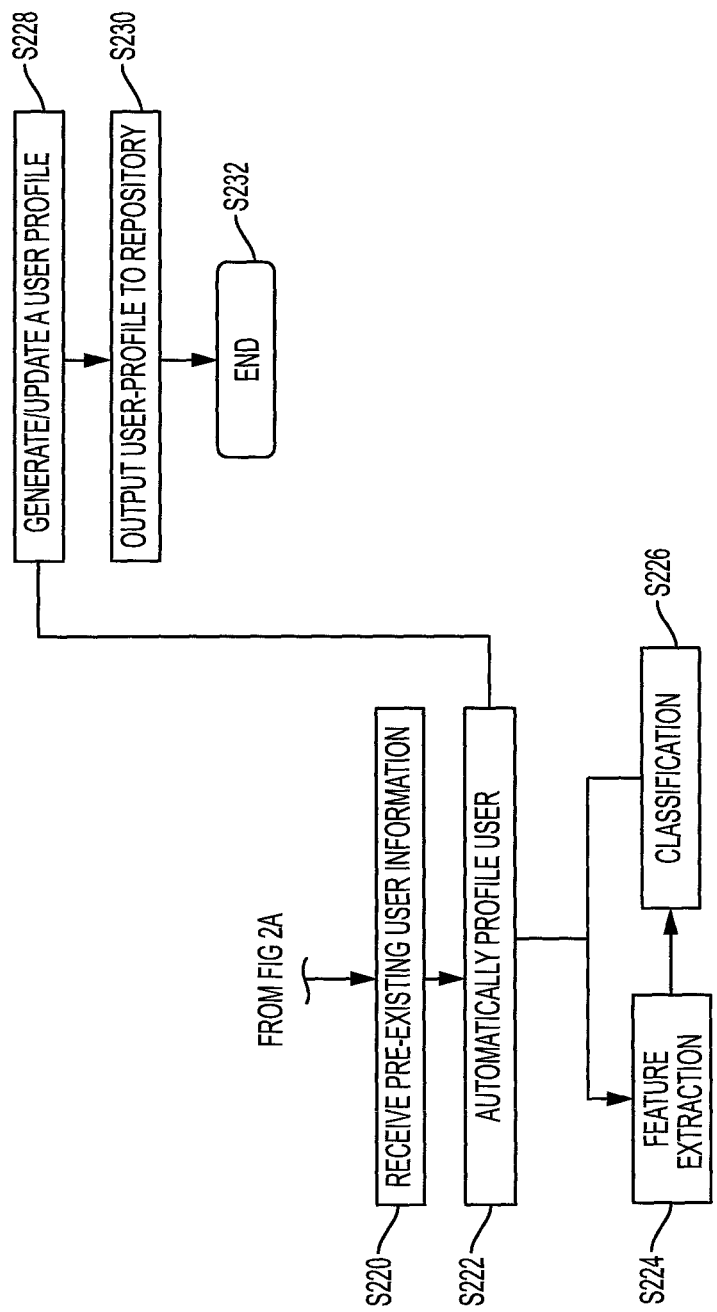

FIGS. 2(A and B) is a flowchart illustrating a method 200 of monitoring a business process for user profiling with the HCRC, the HTMCA component, and PAE in accordance with another aspect of the exemplary embodiment. Referring to FIG. 2A, the method starts at S202. At S204, a human communication retrieval component ("HCRC") is provided for communication with each business process implemented in a BPM system. In a domain-specific business setting, the architect of the business process can define the HCRC as part of a simple data processing architecture which handles both real-time and batch data processing. The HCRC is connected to a business process monitoring component which monitors activities of a business process implemented by a business process management ("BPM") system. The method continues at S206, where a human task monitoring and contextual analysis ("HTMCA") component is optionally provided for communication with each business process implemented in the BPM system. The HTMCA is also connected to the business process monitoring component. Next, at S208, a profile analysis engine ("PAE") is provided for communication with each business process implemented in the BPM system. The PAE is connected to the business process monitoring component, the HCRC and the HTMCA component. At S210, the business process monitoring component alerts the PAE that a given process is being implemented by the BPM system.

At S212, upon request by the PAE, the HTMCA component returns user behavior information which is used to understand the users of the business process. The user behavior information is typically structured runtime data from the BPM system which can be used to identify, for example, bottleneck tasks in activities of any given domain specific business process, which may exist for any given user of the business process, in context to the user's workload within the business process. At S214, upon request by the PAE, the HCRC retrieves all communication-based data from the business process monitoring component which is being exchanged in a given business process, and which is associated with the one or more activities of the business process. The communication data is generally unstructured textual documents such as text comments or emails. Then, at S216, this communication data can be cleaned, assigned authorship properties (the author being the user who generated that step in the process), and attached to meta-data which describes, for example, the details of the specific business concept from where the communication data came from, the role of users, etc. and the like.

The PAE receives the communication data from the HCRC and receives the user behavior information from the HTMCA component at S218. Continuing to FIG. 2B, the PAE can also receive pre-existing information that is external to the business process being implemented by the BPM system at S220. Such information may relate to pre-existing user profiles containing basic user details such as qualifications, demographics, skill sets, etc. and the like; or may relate to textual communication data generated from a user's public social media accounts, such as FACEBOOK, TWITTER, LINKEDIN, etc. Once the user behavior information and communication data is received, the PAE automatically profiles a user of the system at S222. Profiling can include feature extraction from the user behavior information and the textual communication data at S224, and classification at S226 of the user into one or more personality attributes based on the feature extraction at S224. The PAE generates a user-profile object based on the classification at S228.

The user-profile object generated at S228 can be used to identify any of a number of attributes of the user. One attribute can be a user's "concrete" skills related to the use of the BPM system. Concrete skills are determined from the user behavior information returned by the HTMCA at S212 above. "Individual differences" can be identified between the concrete skills of different users to determine a particular user's lack of skill within a given task or activity compared to other users. A user's "soft" skills can also be identified from the user-profile. Soft skills represent the user's preferences related to the use of the BPM system, such as work patterns in the user behavior information reported by the HTMCA. Preferences generally describe how users prefer to complete tasks in a given BPM system. For example, where multiple similar actions can be assigned to the same user, does the user complete all actions immediately upon assignment, or does the user prefer to batch process a fixed number of tasks, irrespective of the timeline involved. Soft skills also represent the user's attitudes related to the use of the BPM system. Attitudes are reflected in the evaluation of a user's personality or psychometric traits, which can be determined from the communication data received from the HCRC at S216. This communication data includes the textual data generated during a given business process implemented by the BPM system. The relationship between personality and language use, as determined by linguistic and statistical analysis of an author's text, is described in Mirkin, et al., "Motivating Personality-aware Machine Translation", Proc. Conf. on Empirical Methods in Natural Language (EMNLP) 2015; Nowson, et al., "Personal Language Analytics Engine for Multilingual Author Profiling", Notebook for PAN at CLEF 2015, Labs and Workshops, Notebook Papers; and Nowson, et al., "Weblogs, Genres and Individual Differences", Proc. 27th Annual Conf. of the Cognitive Science Society (2005).

At S230, the user-profile object is output from the PAE and stored in memory at a user-profile repository, which can be connected to a central user-profile repository for storing and updating user-profiles from multiple entities employing the BPM system at multiple locations. The method ends at S232.

Although the control method 200 is illustrated and described above in the form of a series of acts or events, it will be appreciated that the various steps described herein are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer, (for example, an internal hard drive of RAM), or may be separate (for example, an external hard drive operatively connected with the computer), or may be separate and accessed via a digital data network such as a local area network (LAN) or the Internet (for example, as a redundant array of inexpensive or independent disks (RAID) or other network server storage that is indirectly accessed by the computer, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphics card CPU (GPU), or PAL, or the like. In general, any device, capable of implementing a finite state machine that is in turn capable of implementing the flowchart shown in FIG. 2, can be used to implement the exemplary method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

Figure 3A:
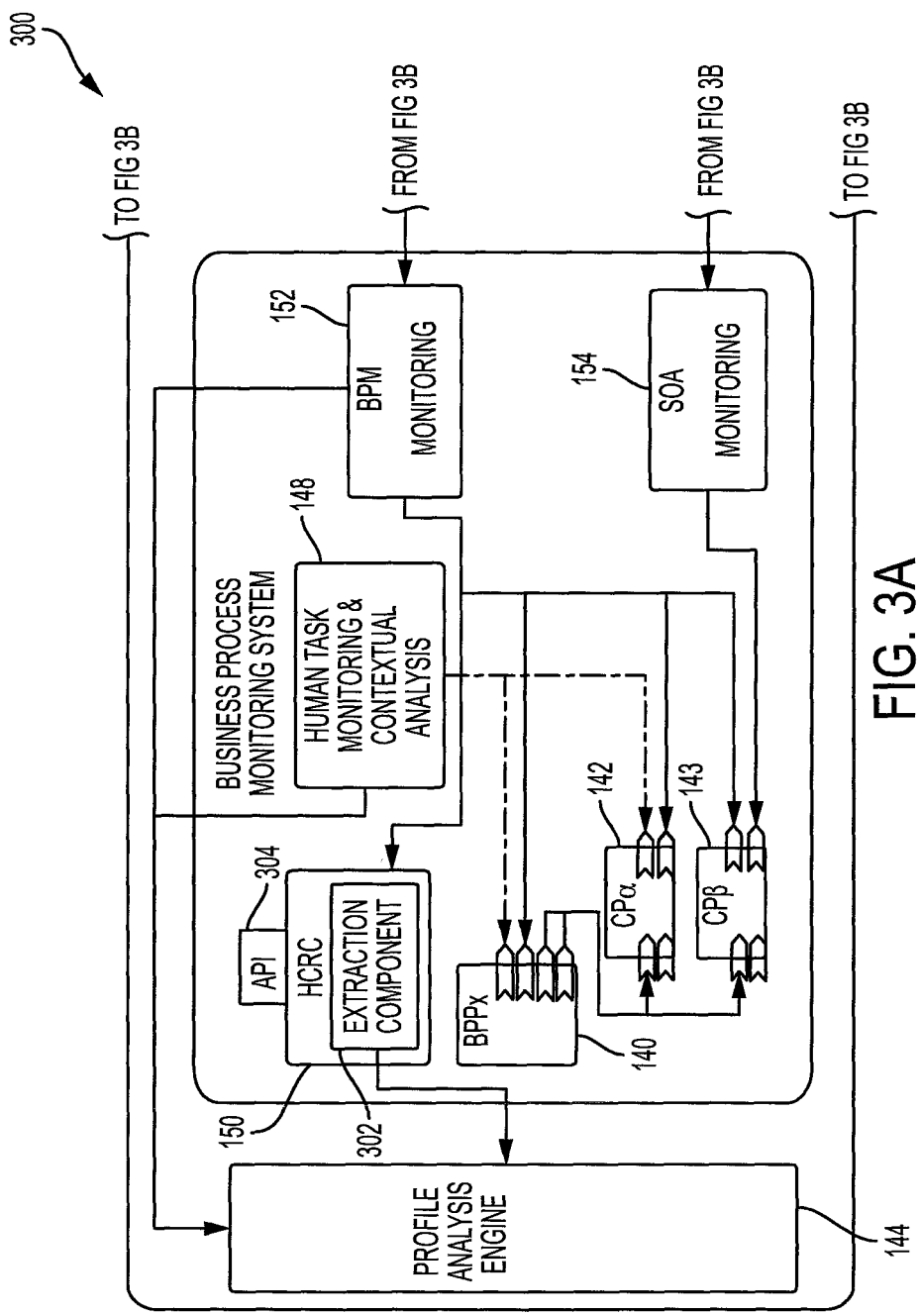
FIG. 3, which is split into FIG. 3A and FIG. 3B for ease of illustration, is a functional block diagram of an example domain-specific business process deployed into a business process management system for user profiling.
Figure 3B:
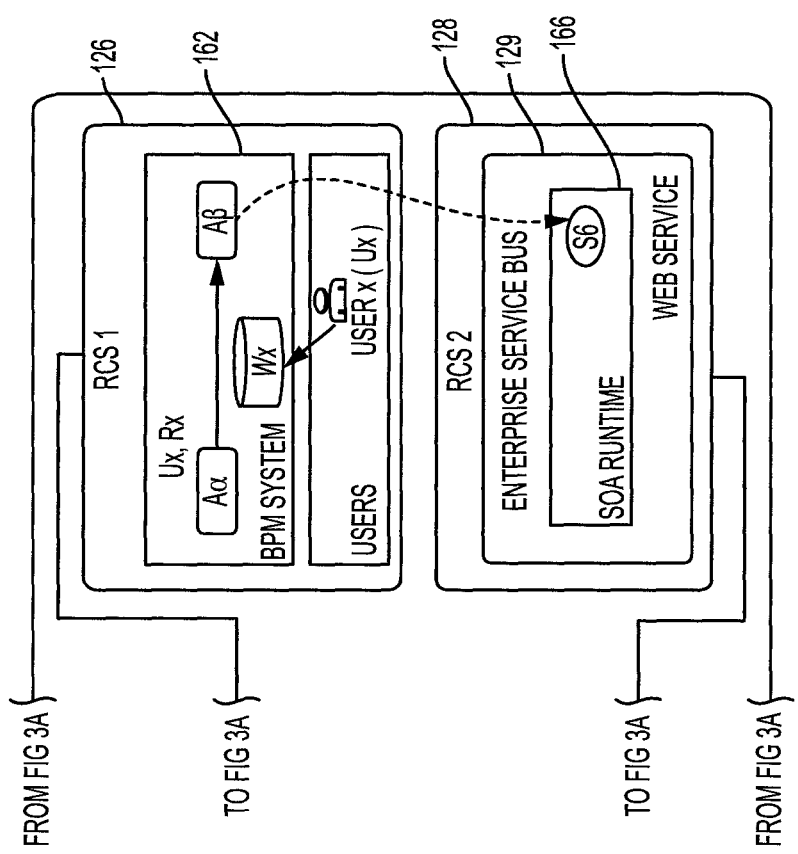

FIG. 3, split into FIG. 3A and FIG. 3B for ease of illustration, illustrates an example of user profiling in a domain-specific business process 300 deployed in a business process management ("BPM") system 162. As shown in FIG. 3B, the first remote computing system ("RCS1") 126 provides access to the BPM system 162. The second remote computing system ("RCS2") 128 provides access to an enterprise service bus (ESB) 129 which executes webservices based on service oriented architecture (SOA) methodology 166 consisting of services S6. The BPM system 162 consists of activities A$\alpha$ and A$\beta$, and users including User x ("Ux") with a work list ("Wx") and a pre-defined role ("Rx"). The activity A$\alpha$ is not attached to any service as it is a 'manual activity' on which user Ux works. Activity A$\beta$ needs an automated service to complete, and thus automated activity AP is attached to a service S6. Each manual activity can be associated to the pre-defined role, and each role can be assigned to a single human-user or to a group of users. The work list refers to items the user can selectively perform for the business process to work successfully in a stipulated time frame. The HTMCA component 148 stores knowledge of this information, which is defined by the architect.

As shown in FIG. 3A, business process monitoring capabilities are provided by the business process monitoring component 152 and can include, inter alia, the generation of events when activities execute, and the computation of execution times for, and the reporting of, various states in which the business processes operate. The business process monitoring component 152 monitors both the BPM system 162 and ESB 129 by making use of business process probe (BPPx) 140, concept probes CPα 142 and CPβ 143, and the HTMCA component 148. SOA monitoring capabilities are provided by the SOA monitoring component 154 and can include monitoring of, inter alia, service invocations, computing execution times for various service operations, and reporting of the states in which the services operate, etc. Concept probes CPα 142 and CPβ 143 each correspond to respective business concepts a, 13 used through manual activity 'Aα' and automated activity 'Aβ' in the illustrated business process 300. The business process probe ("BPPx") 140 can exchange information with the concept probes 142-143 to aggregate business process information. The concept probes 142-143 are in connected communication with the business process monitoring component 152.

All these components have been explained in detail in corresponding U.S. Publication No. 2015/0046212 and U.S. application Ser. No. 14/560,293 discussed above. However, they are discussed herein with reference to FIG. 3 to illustrate the adaptability of the exemplary method for user profiling into existing systems.

The BPM system 162, ESB 129, SOA 166, business process monitoring component 152, SOA monitoring component 154, business process probe 140, CPα 142, CPβ 143, HTMCA component 148, HCRC 150, and PAE 144 can all be in connected communication with each other. The business process monitoring component 152 alerts the PAE 144 that a given business process is being implemented by the BPM system 162 so that the PAE can begin user profiling. In general, in response to a query by the PAE 144, each concept probe 142-143 can specifically interrogate the business process monitoring component 152 with regard to the events generated from the BPM system 162 about the execution of its respective activity Aα, Aβ which may be of interest in generating a user profile.

As a business process starts, the PAE 144 queries the HTMCA component 148 to retrieve context information from the HTMCA component 148 about the human users (Ux) which may be involved in the business process. The concept probe CPα 142 can perform this query so that the information returned is specifically bound to the business concept "α." The information returned includes contextual information such as include roles (Rx) and work lists (Wx) assigned to the user, and workload(s) corresponding with each activity that is involved in a business process. For example, a manual activity Aα can be assigned to a role 'Rx', which can be assigned to a single user 'Ux'; however, a single role R can be assigned to multiple users and/or a single user can have many unique roles. In other words, concept probe CPα 142 can interrogate the HTMCA component 148 in response to a query by the PAE 144 to acquire user information that exists before the user begins working on a respective activity Aα. For example, in response to a query by the PAE 144, the concept probe CPα 142 can interrogate the HTMCA component 148 for a list of all the business processes that the user can work on or has worked on. This function provides these details at a macro level, i.e. at business process level, rather than providing the details at a micro level for a manual task. In another example, the HTMCA 148 can provide all roles the user can perform, has performed, or which are or were assigned to the user. This function can be used at any time interval to determine the role-based load on the user. This function can help determine if a particular user is too overburdened to perform a number of tasks.

The concept probe CPα 142 can also interrogate the HTMCA component 148 in response to a query by the PAE 144 to acquire user information after the user finishes working on a respective activity Aα, or after a user finished working on all activities in a given business process. In other words, concept probe CPα 142 can interrogate the HTMCA component 148 in response to a query by the PAE 144 to acquire user behavior information corresponding to structured runtime data generated as a result of the user working in the BPM system 162. For example, the HTMCA component 148 can provide the querying concept probe 142 (or business process probe 140) with details regarding the business processes that were executed by a user in a time period. This function provides a detailed overview of the business process that the user worked on, the activities s/he worked on, and relevant information about the activity, such as its execution time, etc. Another function can provide a detailed list of all the activities that are present in the work list of a specific user including activities that are incomplete. This function can be used to correlate the number of tasks active in a user's work list and the amount of time those tasks have been active. All of this information queried by the PAE 144 and returned by the HTMCA 148 component can be used to observe work patterns for each given user in a business process.

Once the PAE 144 queries the HTMCA component 148 to determine the human users (Ux) which may be involved in the business process being implemented by the BPM system 162, the HCRC 150 begins capturing communication data from the users associated with the given business process. In this regard, the HCRC 150 can be connected in communication with at least one monitoring component, such as the business process monitoring component 152, to capture all the communication-based data from the monitoring component. The concept probes 142, 143 can be utilized to interrogate the business process monitoring component 152 for this information. For example, the concept probe CPα 142 can gather and correlate communication data from activity "Aα" so that this data is specifically bound to the business concept "α." The HCRC 150 can handle both real-time and batch data processing. Thus, the communication data captured by the HCRC 150 can be stored in memory (such as system memory 114 (FIG. 1) and collated over time. Upon a request by the PAE 144, the HCRC 150 then retrieves communication data. The request is formulated to retrieve communication data which is associated with a particular user involved in the business process and being profiled by the PAE 144. The HCRC 150 may utilize any suitable Information Retrieval (IR) technology to search for all the relevant communication data where the particular user is involved and retrieves it.

The communication data is associated with the one or more activities of the business process. For example, manual activity Aα is assigned to role Rx, which is assigned to a single user Ux. Manual activity Aα can be one of many activities which comprise user Ux's work list Wx. The user Ux works on activity Aα and generates unstructured communication data, which may include textual communications such as text comments, email, word processing documents, spreadsheets, presentation materials, PDF files, web pages, news/media reports, case files, transcriptions etc. and the like. This communication data may be generated, for example, when a user writes comments while starting a process or activity, writes comments while completing an activity or process, or writes emails which are exchanged while approving, rejecting, or asking for more information as a result of the process or activity. The communication data may also include textual data which is external to the business process, such as communication data generated from a particular user's social media accounts (e.g., FACEBOOK, TWITTER, or LINKEDIN).

The HCRC 150 can optionally utilize an extraction component 302 set up to parse the unstructured communication data so that it may be cleaned, assigned authorship properties (the author being the user who generated that step in the process), and attached to meta-data which describes, for example, the details of the specific business concept from where the communication data came from, the role of users, etc. and the like. As a result of processing by the extraction component 302, the textual data generated during initial and subsequent activities of a business process can be consistently tracked and retrieved as it moves through the rest of the process.

The HCRC 150 can retrieve communication data associated with a particular business process using an application program interface (API) 304. The API 304 interfaces with the various sources of unstructured communication data being generated from the various activities and processes implemented at the BPM system 162. The API 304 can access and extract the textual communications and metadata, such as author, date, size, about the documents. Each source of unstructured communication data, that is each business process that generates communication data, can have its own API. Alternatively, a single API of the can interface with the numerous sources of unstructured communication data, which can be defined by the architect of the business process. The HCRC 150 thus keeps track of all of the communication data, and in particular textual communications, being exchanged in the process of FIG. 3 to gain insight about the way a given user communicates in relation to their behavior information coming from the HTMCA component 148 (i.e., user workload and the priority of the particular business process being worked on). The profile analysis engine ("PAE") 144 receives communication data from the HCRC 150 and user behavior information from the HTMCA component 148 to create or update user profiles for each respective user of the business processes. Additional details of the exemplary PAE 144 are further described with reference to FIG. 4.

Figure 4:
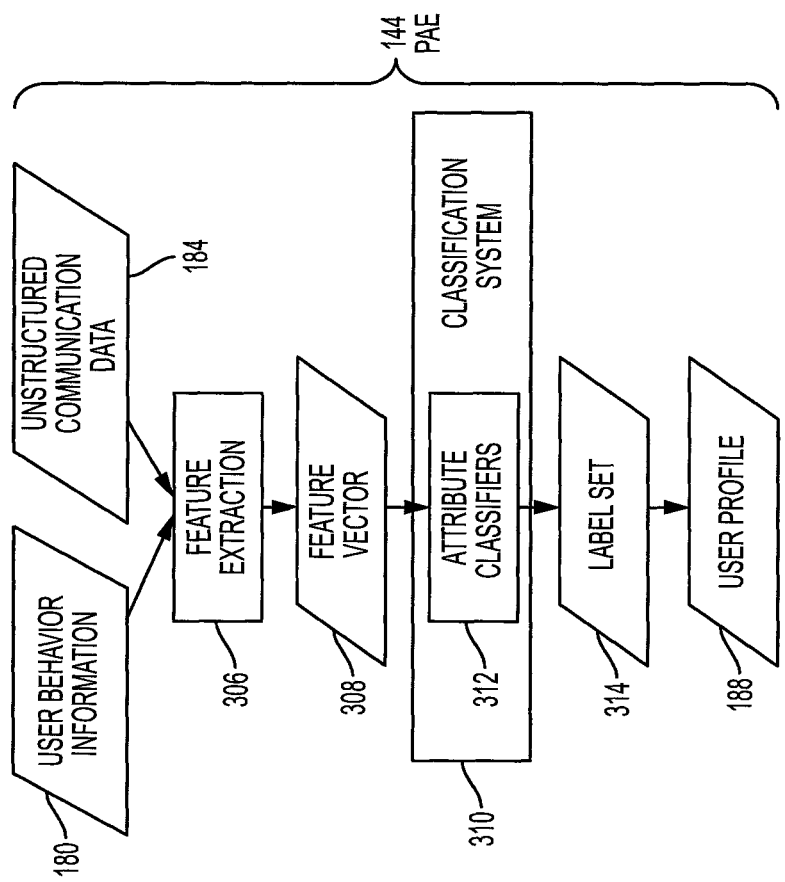
FIG. 4 is a functional block diagram of an exemplary profile analysis engine ("PAE") component in the system of FIG. 1.

FIG. 4 illustrates the components of the exemplary profile analysis engine ("PAE") 144. The PAE 144 can include a separate memory (i.e., separate from memory 114 in FIG. 1) storing instructions for performing the exemplary method, which are executed by a computer processor (which may be separate from processor 112 in FIG. 1) communicatively connected with the memory. For each task or process carried out by a user the PAE 144 receives the unstructured communication data 184 from the HCRC and user behavior information 180 from the HTMCA component (or corresponding concept probe). The user behavior information 180 includes structured BPM system runtime data, knowledge about actors involved in the business process, the roles associated to each business process activity, and structured data which is directly generated by the business process. The PAE 144 can also receive prior profile information including basic user details such as qualifications, demographic details, skill sets, etc. and the like. The prior profile information may be accessed from a central repository which stores multiple user profiles. The PAE 144 can be run in real-time (as per the HTMCA) on a single action and a single instance of data; or data can be collated over a period of time with the PAE run on this collected batch data.

The PAE 144 component includes instructions for a features extraction component 306, which extracts textual features from the unstructured communication data 184 received from the communication retrieval component. For the user behavior information 180, which includes structured BPM run-time data, the features will be constructed directly from the data itself. For the unstructured communication data, and in particular textual communication data, the features extraction component 306 performs linguistic processing such as tokenization, part-of-speech tagging, parsing etc. and the like. In other words, the features extraction component 306 performs natural language processing to extract the relevant terms and features from the textual communications. For example, the features extraction component 306 can parse the contents of the various textual communications extract the noun phrases, names of entities, dates, titles, and other terms that provide indicia of business contexts and personality attributes, and use these extracted terms as the relevant terms. In some embodiments, the features extraction component 306 can use the raw terms from the textual communications as the relevant terms. The parsing can be performed via a combination of written rules and named entity detection, chunking, and extraction of dependency relations such as subject, object, and modifiers between lexical nodes. Language specific tools accounting for different grammars can be included, such that parsing can be customized for different languages. In addition, parsing can be customized to account for communication data from social media, such as from LINKEDIN, TWITTER, FACEBOOK, and the like.

The features extraction component 306 then extracts the features of interest from the communication data on which natural language processing has been performed. Features of interest can refer to word-level or class-based features. Word level features are associating information to the surface and lemma forms of the words directly, while class-based features are more abstract and more generalized: they encode the presence of a given POS, semantic type, hashtags, etc., without trying to feature the surface form. The features are stored as feature vector 308 (e.g., a bit vector, where each bit corresponds to the presence or the absence of a feature, such as a relevant term). The features extraction component 306 then outputs the features vector 308 to the classification system 310.

The PAE 144 provides the classification system 310 for classifying the unstructured communication data into the defined personality attribute categories. The classification system 310 contains a set of classifiers 312 to predict values on the personality attributes of the user, where each classifier corresponds to a personality attribute category. The personality attribute categories can be obtained from, for example, the "Big Five" (Extraversion, Emotional Stability, Conscientiousness, Agreeableness and Openness), Myers-Briggs Type Indicators, or Social Styles values. Each classifier maps the relevant terms determined by features extraction component 308 from the unstructured communication data into a yes/no decision on whether the personality attribute applies to the communication data. To create a learned classification system, the business process architect can first define or craft a set personality attributes, along with their parameters. The business process architect also collects a training set of unstructured communication data, which can include prior research data, or a labelled data set created specifically for classifying personality attributes, or a combination thereof. For example, the training set may include unstructured textual communications created based on actual unstructured textual communications used by real vendors, customers, businesses, etc. The process architect can then assign each unstructured textual communication in the training set to one or more of the defined personality attributes categories. Once the unstructured communication data is labeled (i.e., assigned to the respective personality attributes), the process architect can apply any of a variety of well-known learning algorithms to the training set to create a classifier for each personality attribute category. Examples of learning algorithms include linear support vector machines, logistic regression, boosted decision trees, Naive Bayes models, Bayes networks, and other learning models. Learning algorithms operate by adjusting the parameters in a classifier to predict the labels of the training set. A classifier takes as input a feature vector, such as features vector 308, assigns a weight or value to each present or "on" bit based upon the learning algorithm applied to create the classifier, and computes a weighted sum for the input feature vector. The calculated weighted sum can then be used to determine whether the personality attribute corresponding to the classifier applies to the unstructured textual communication from which the feature vector was created. For example, the weighted sum may be a floating point score or other numerical score, where a high score means that the personality attribute corresponding to the classifier that generated the score is likely, while a low score means that the corresponding personality attribute is unlikely. In other words, the calculated weight sum predicts a personality attribute for a given user from which the textual communication was generated. Each textual communication input into the PAE 144 can be labeled with the predicted personality attribute, and a set of predicted labels 314 for the personality attributes of the given user can be created as each textual communication generated in given business process is processed by the PAE 144. The predicted labels 314 form part of the structure of the user profile object 188, which can be used to enrich or update an existing user profile or output as a new profile.

The user profiling system and method as illustrated in FIGS. 1-3 can be deployed in various settings, including an embodiment where a simple exchange of textual information is being exchanged in a business process. The details of this business process are further described below with reference to FIG. 5.

Figure 5:
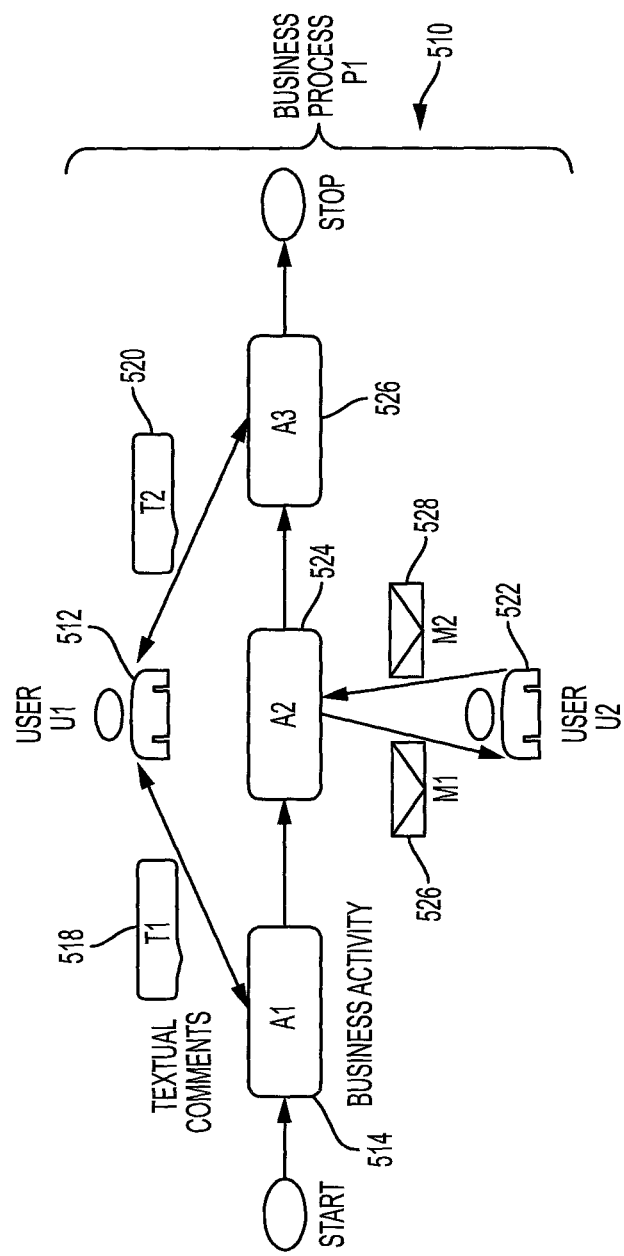
FIG. 5 is a functional block diagram illustrating an example of messages being exchanged between users of a business process in accordance with one aspect of the exemplary embodiment.

FIG. 5 illustrates a basic example scenario where a profile analysis engine ("PAE"), a human communications retrieval component ("HCRC"), and a human task monitoring and contextual analysis ("HTMCA") component would be implemented in an exchange of textual information between users, at least one of which is participating in a business process P1 510. A first user U1 512 takes part in completing activity A1 514 and A3 516 and exchanges textual comments T1 518 and T2 520 in these activities. A second user U2 522 is involved in activity A2 524 and exchanges mail M1 526 and M2 528 with the system to complete the activity A2 524. The textual communications 518, 520, 526, 528 are in a natural language, such as English or French. The textual communications 518, 520, 526, 528 are representative of the communication data that is retrieved by the exemplary HCRC disclosed herein (shown as 150 in FIGS. 1 and 3). User behavior information in completing activities 514, 516, and 524 is representative of the information that is retrieved by the HTMCA component (shown as 148 in FIGS. 1 and 3). All of this information can be fed into the exemplary PAE (shown as 144 in FIGS. 1 and 3) to create and/or update user profiles for the users 512, 522.

Figure 6A:
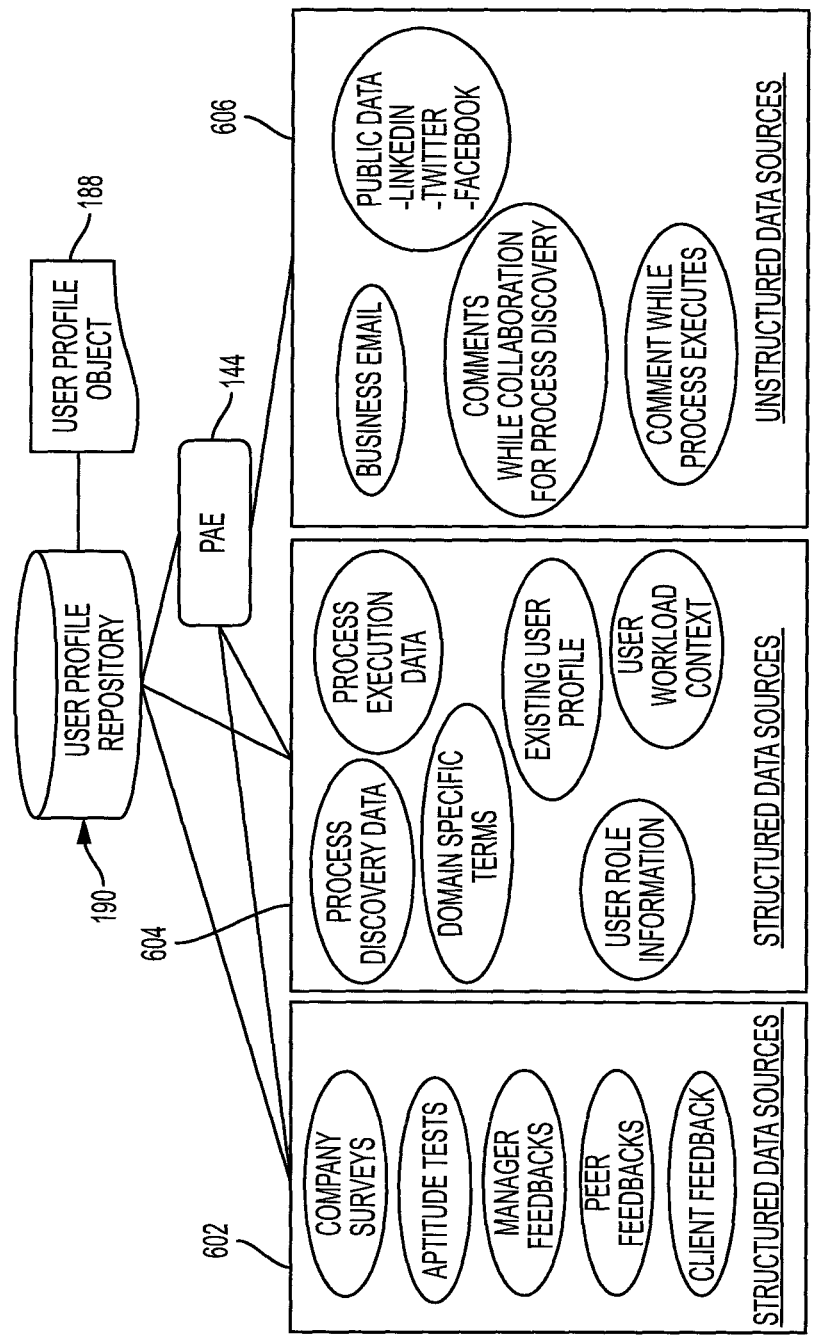
FIG. 6A is a functional block diagram illustrating the data sources utilized for user profiling, in accordance with one aspect of the exemplary embodiment.
Figure 6B:
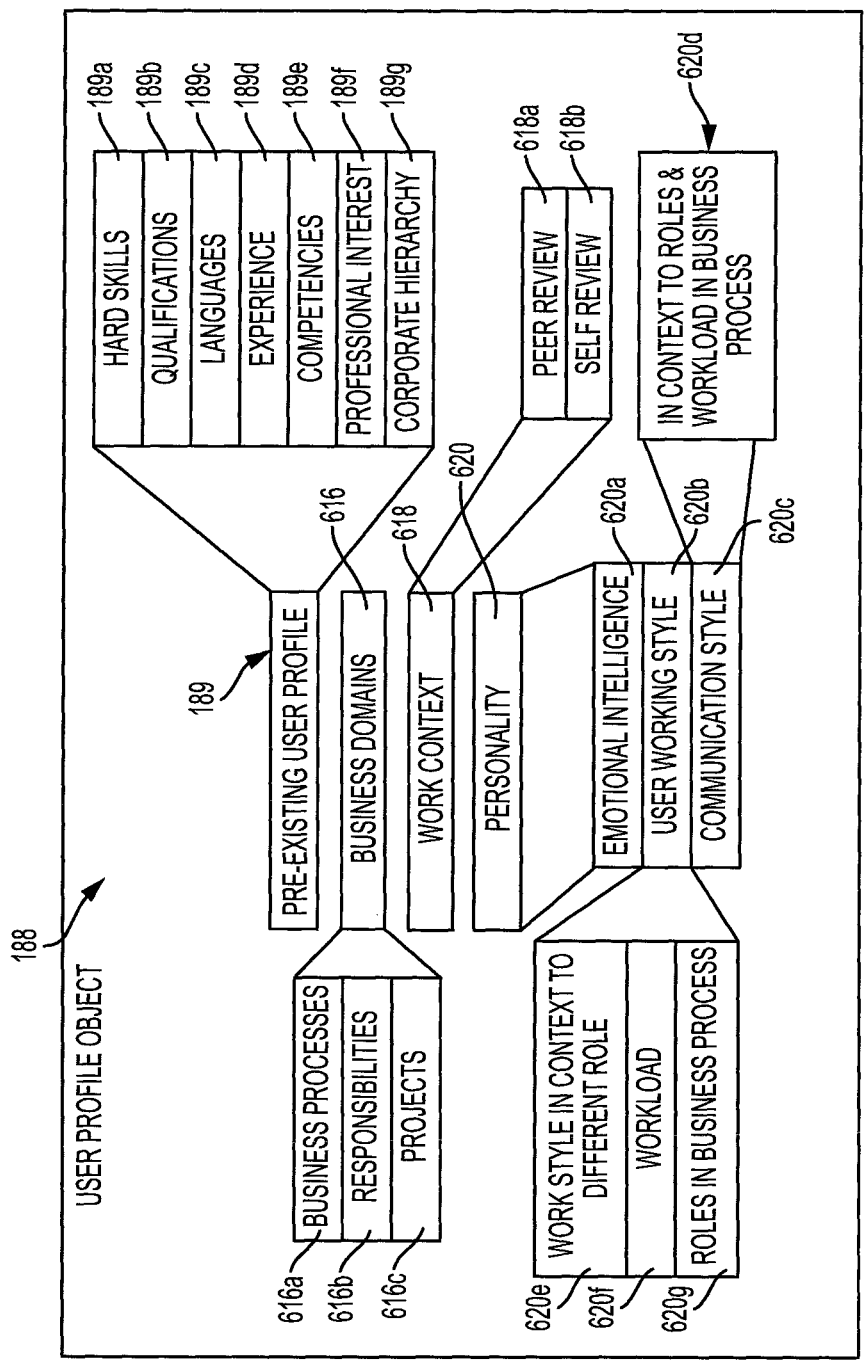
FIG. 6B is a block diagram illustrating an exemplary structure of a user profile generated from the data sources illustrated in FIG. 6B, in accordance with another aspect of the exemplary embodiment.
Figure 6C:
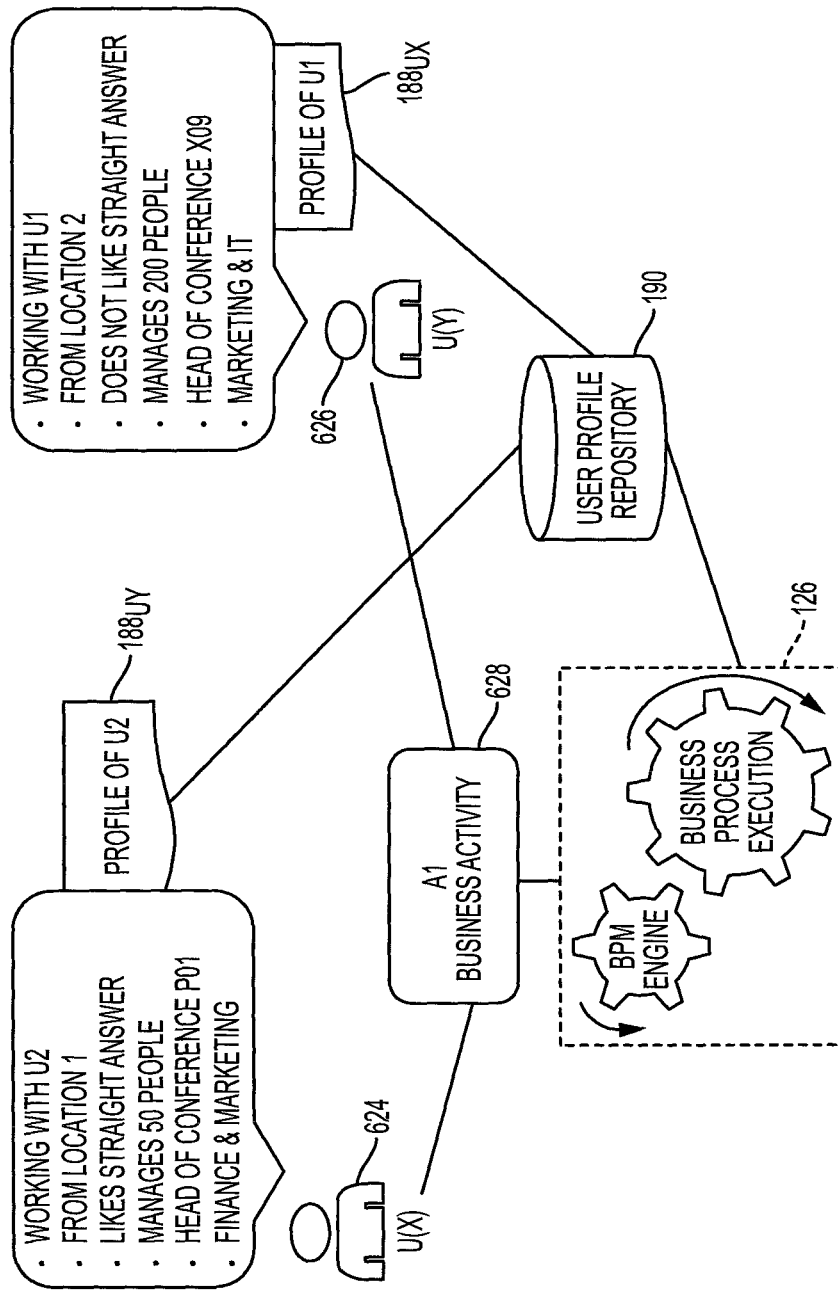
FIG. 6C illustrates an example process of automatic sharing of user profiles having the structure illustrated in FIG. 6B between different users of the business process management system.

Referring now to FIGS. 6A-6C, FIG. 6A is a functional block diagram illustrating the exemplary profile analysis engine's 144 utilization of various data sources 602, 604, 606 that may provide the necessary information for generating the user profile object 188. The structure of user profile 188 is illustrated in FIG. 6B, and an exemplary use for the user profile 188 is illustrated in FIG. 6C. The profile analysis engine ("PAE") 144 utilizes data sources 602, 604, 606 to generate the user profile object 188, which is stored as a new profile in the user profile repository 190, or used to enhance or enrich pre-existing user profiles 189. Structured data sources 602 refer to pre-existing, structured information that is not directly generated or used by a business process, such as company surveys, aptitude tests, manager feedbacks, peer feedback, and client feedback. Structured data sources 604 include pre-existing information used in a business process, such as user role information, existing user profiles, and domain specific terms. Structured data sources 604 also include information which is directly generated by a business process, such as process discovery data, process execution data, and user workload context. Structured data sources 604 are representative of the user behavior information retrieved by the exemplary HTMCA component disclosed herein (shown as 148 in FIGS. 1 and 148 in FIG. 3). Unstructured data sources 606 can also be utilized by the PAE 144 to generate/update the user profile object 188. Unstructured data sources 606 include information which is generated by a business process, such as business emails and comments generated while a user is working on a specific business process. Other unstructured data sources 606 are external to a business process, such as public data retrieved from various social media platforms like LINKEDIN, TWITTER, FACEBOOK, and other similar sources which help to generate a more personalized user profile object 188. Unstructured data sources 606 are representative of the communication data retrieved by the exemplary HCRC disclosed herein (shown as 150 in FIGS. 1 and 150 in FIG. 3). The PAE 144 processes these structured and unstructured data sources 602, 604, 606 in order to create the information useful for enhancing the user profile object 188, which is stored in the user profile repository 190.

Referring to FIG. 6B, the structure of the user profile object 188 is illustrated in greater detail. The pre-existing user-profile 189 may exist for some or all of the corporate and/or external users participating in a business process. The pre-existing user profile 189 may contain user details, such as qualifications, demographic details, skill sets, and the like, and may be created for each new employee joining a corporation or client using a business process of a corporation. The pre-existing user profiles 189 are typically stored in a central repository (not shown). The user profile 188 includes several types of information including, but not limited to, the pre-existing user profile 189 containing information related to a user's hard-skills 189a, qualifications 189b, languages 189c, experiences 189d, competencies 189e, professional interests 189f, corporate hierarchy 189g and the like. In order to generate a more complete user profile, the user profile 188 includes various elements in addition to the information included in the pre-existing profile 189, including user information related to business domains 616, work context 618, and personality 620.

Business domains 616 can contain information about various business processes 616a a user is involved in, along with the responsibilities 616b associated with those processes and the projects 616c in which the user has been involved. User information related to business domains 616 is generally retrieved directly from the application programming interfaces ("API's") provided by an associated business process management system. Work context 618 can contain information regarding the various projects or functions that a user may have worked on, how they perceive themselves 618*a* based on outcomes of that work, and how others perceived them 618*b* and their work.

Personality information 620 of a user is advantageously included in the exemplary user profile object 188 generated according to the exemplary systems and methods disclosed herein. Personality information 620 includes elements such as emotional intelligence 620*a*, user working style 620*b* (i.e., how a user behaves under various working conditions 620*e*, roles in business processes 620*f*, and workloads 620*g*), and user communication style 620*c* (i.e., how the user's communication style is affected in context of the user's workload and function or roles in business process 620*d*). The personality information 620 in the user profile object structure 188 advantageously provides additional context over basic user profiles as a user works in various business processes over the course of the user's employment, where different levels of workload and expectations from his/her peers occur.

FIG. 6C illustrates an exemplary use of the user profiling system disclosed herein in a business process where automatic user profile sharing is shown between different users of a BPM system 126. As shown in FIG. 6C, two different users U(X) 624 and U(Y) 626 are working with each other for the first time, on the same business activity (A1) 628 and from different departments and different locations. The user-profile $188_{UX}$ of U(X) 624 and the user profile $188_{UY}$ of U(Y) 626 provide some idea about the simple characteristics of each user which may be beneficial to each user. For example, the characteristics of U(Y) 626 which may be in U(Y)'s profile $188_{UY}$ include the fact that U(Y) is from the United States and has a straightforward communication style. Other exemplary characteristics in U(Y)'s profile $188_{UY}$ may include how many people the user manages; that he or she has been a 'head of conference P01' in the past, etc. In addition, during user profile creation by the PAE, the communication data retrieved by the HCRC and user behavior information retrieved by the HTMCA allows the gathering of information such as 'various roles a user works in past' and may help to highlight the achievements of respective users in their respective user profiles. All of these details can be included in user profiles $188_{UX}$, $188_{UY}$, which are accessible to users from multiple locations via the user profile repository 190. The particular details and characteristics which are accessible in the user profiles $188_{UX}$, $188_{UY}$ may be dependent on the "level" of user data that is accessible by each user, which may depend on the organizational hierarchy and relevance to the business process.

The user profiling of the present disclosure and illustrated in FIG. 6C may be useful in software development and collaboration tools that have their own workflows, such as Atlassian's JIRA software, which involve various users from different time zones and different cultural background with various degrees of language and technical skills. Similarly, the exemplary user profiling may be useful in the formation of teams, where the goal may be optimization of team formation considering hard skills, cost, and compatibility of team members by alignment of "soft skills," such as personality. Accordingly, the user profiling method disclosed herein may be useful in measuring these soft skills in the team formation framework.

Figure 7A:
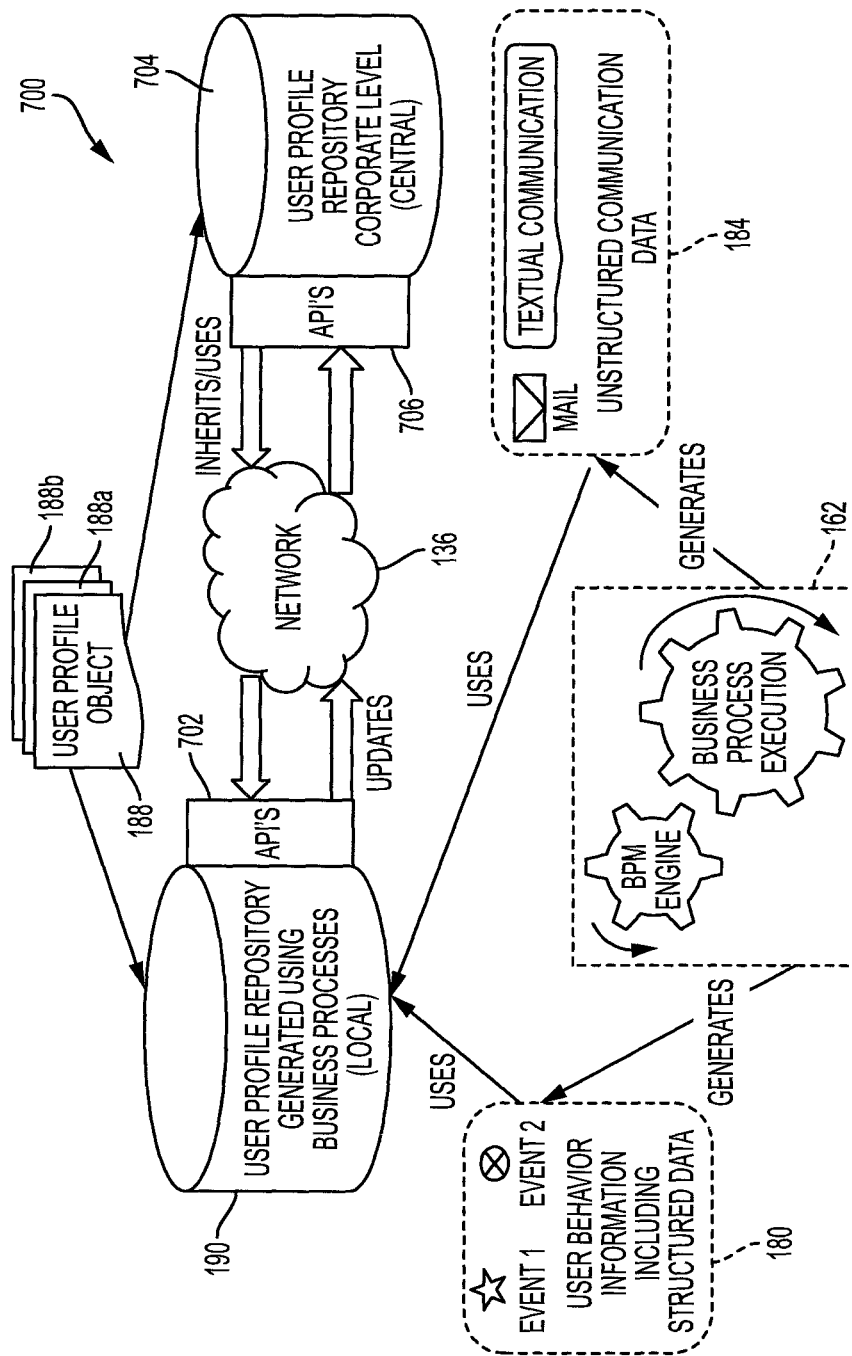
FIG. 7A is a functional block diagram illustrating user profile creation using a business process management system, in accordance with a further aspect of the exemplary embodiment.
Figure 7B:
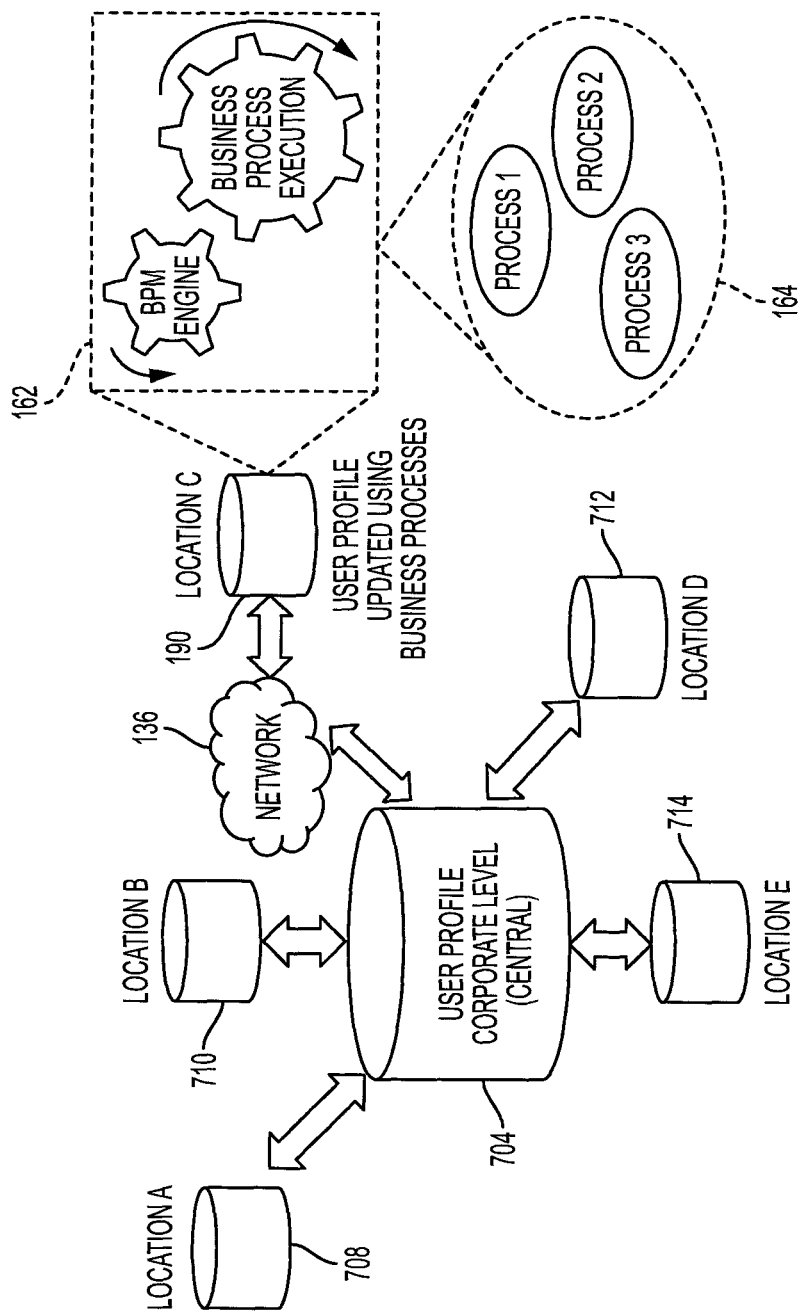
FIG. 7B is a functional block diagram illustrating a federated view of business processes and user profile creation with the business process management system illustrated in FIG. 7A.

FIGS. 7A and 7B illustrate functional block diagrams of an example system for user profile creation from a business process management ("BPM") system 162. BPM system 162 is run by an entity at a local-level location of an enterprise, represented by the user profile repository 190. The BPM system 162 generates user behavior information 180 including structured data and unstructured communication data 184 used to create the user profile object 188 of a user (not shown) at the local location. The user profile is stored in the local user profile repository 190. One or more application programming interface ("API") 702 at the local user profile repository 190 can be utilized to retrieve the structured and unstructured data 706, 708. Many organizations have both global and local processes that may create new user profile objects 188, 188*a*, 188*b* which may be stored in the user profile repository 190 as a new profile or used to update existing user profiles. Accordingly, the local user profile repository 190 is communicatively linked, via network 136, with a global-level or central user profile repository at another location, such as corporate level repository 704. Corporate level repository 704 may include its own API 706. User-profiles 188, 188*a*, 188*b* are updated across the local and central levels through the capability of the one or more API's 702, 706, which are adapted to interface with one another. In this regard, user-profiles 188, 188*a*, 188*b* are synchronized with the global corporate profile repository 704 to maintain a consistent user profile object.

FIG. 7B is a functional block diagram of a federated system of user profiling similar to FIG. 7A, but with multiple entities at local level repositories in addition to user profile repository 190 (represented here as Location C). In particular, additional local level repositories are represented by Location A 708, Location B 710, Location D 712, and Location E 714. Each of the entities at local repositories 190, 708, 710, 712, 714 may belong to a parent or corporate entity represented by the corporate-level repository 704. Each entity at the at local repositories 190, 708, 710, 712, 714 can also employ a BPM system to implement various business processes, such as BPM system 162 implementing business processes 164 at Location C 190. The local repositories 190, 708, 710, 712, 714 are all communicatively connected to the central, corporate-level repository 704 via network 136. In this regard, the user profiles created at each of the local repositories 190, 708, 710, 712, 714 can be uploaded to and stored in the central repository 136. Furthermore, the user profiles created at each of the local repositories 190, 708, 710, 712, 714 are updated both at the local-level and central repository 136 as additional business processes are implemented with the BPM system by the multiple entities.

Another example setting where the user profiling process 300 illustrated in FIGS. 3 and 4 can be deployed includes a setting where multiple business processes are being implemented at a single entity location. The details of this setting are further described below with reference to FIG. 8A. For example, a first business process from which user profiling is performed is a 'loan approval process' having one or more activities. The details of this business process are further described below with reference to FIG. 8B. A second business process from which user profiling is a 'leave approval process' having one or more activities. The details of this setting are further described below with reference to FIG. 8C.

Figure 8A:
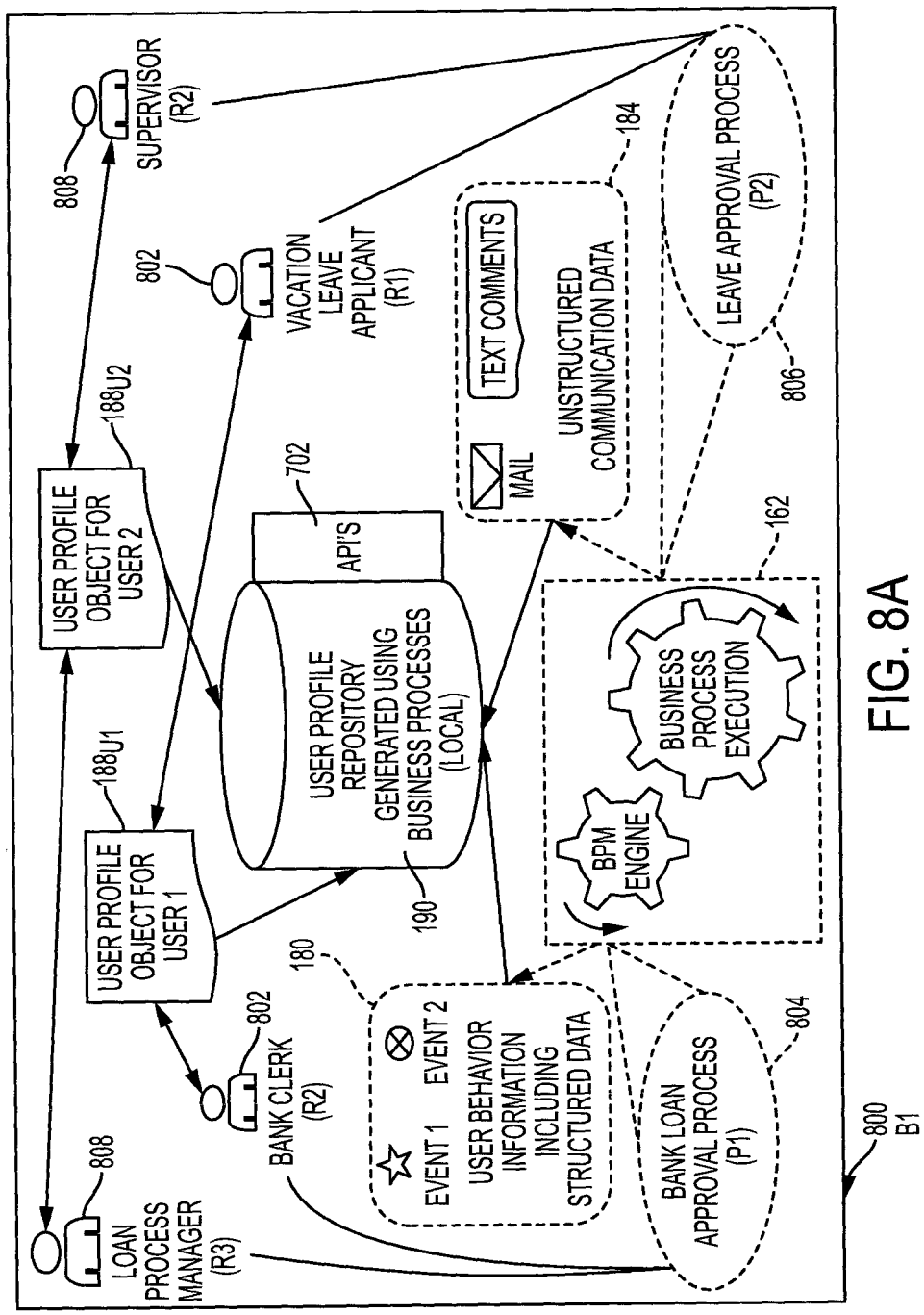
FIG. 8A illustrates an example process where user profiling is achieved during a bank loan approval process and a leave approval process implemented by the business process management system.
Figure 8B:
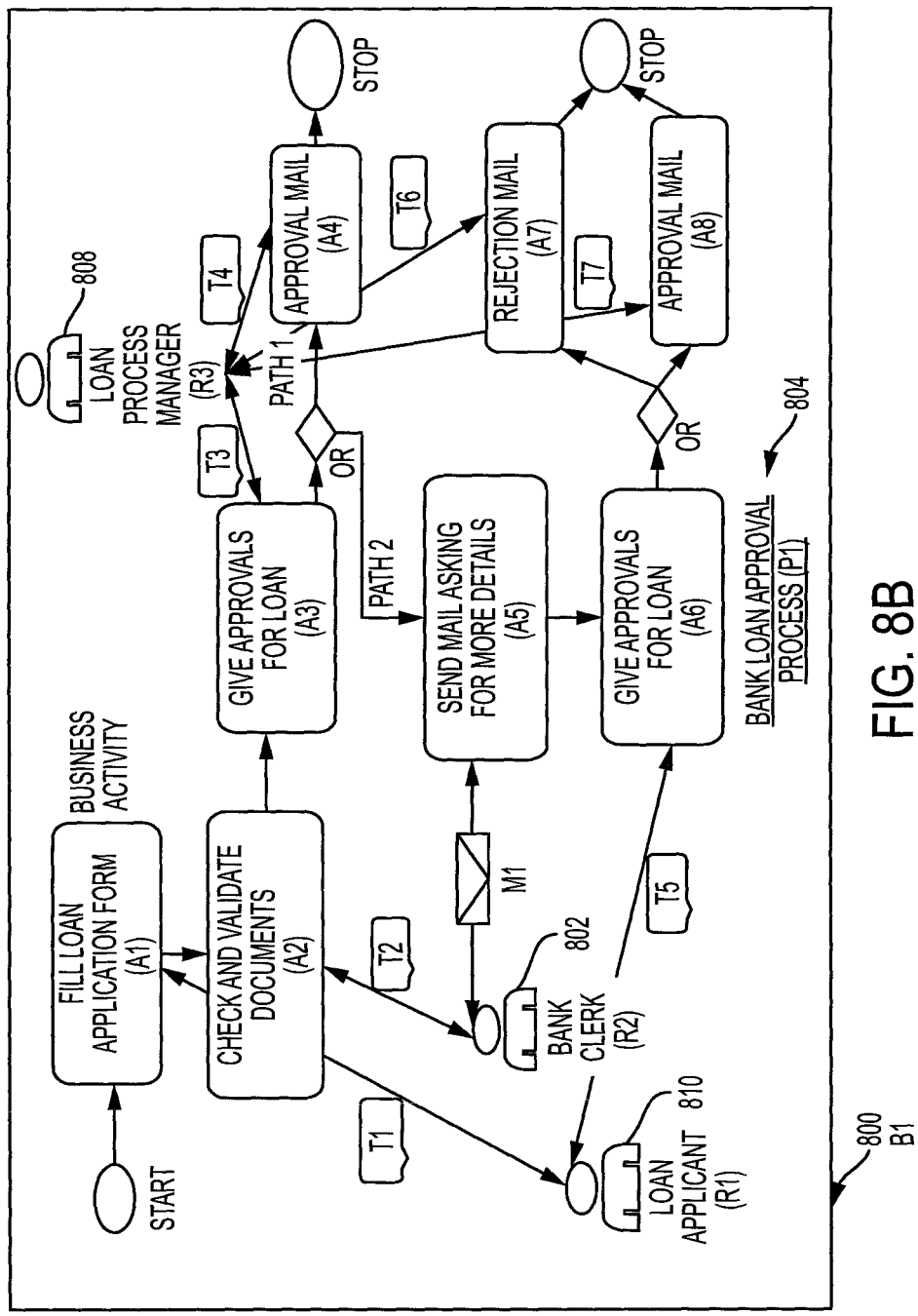
FIG. 8B illustrates an example process of communication data retrieval in the bank loan approval process of FIG. 8A.
Figure 8C:
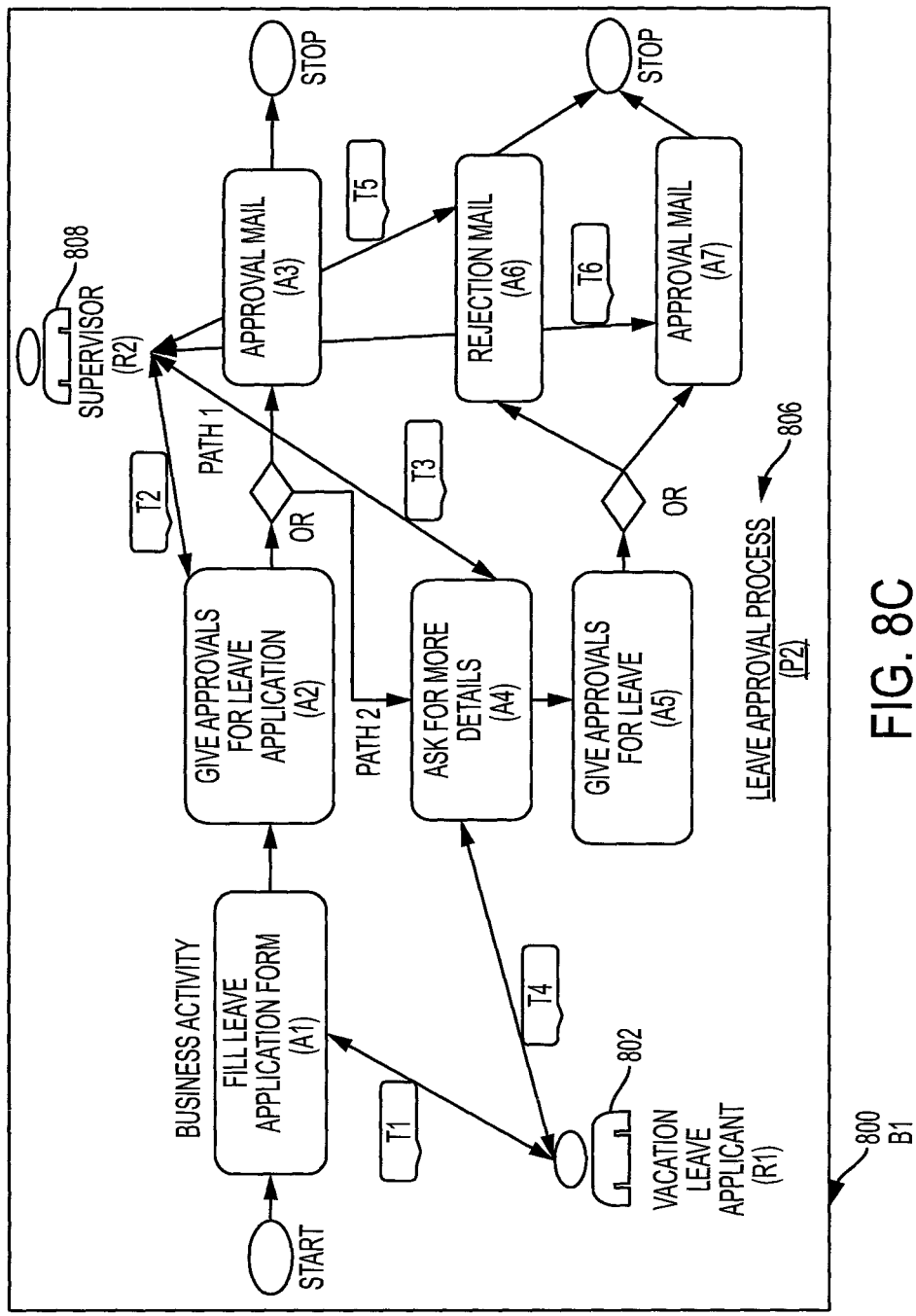
FIG. 8C illustrates an example process of communication data retrieval in a vacation leave approval process of FIG. 8A.

FIGS. 8A-8C illustrate an example scenario where user profiles are created at a single entity location 800 (here representing a bank) for users involved in multiple processes implemented by BPM system 162. 'User 1' 802 has different roles (Bank Clerk (R2) and Vacation Leave Applicant (R1))

in two different processes (P1, bank loan approval process) 804, (P2, leave approval process) 806. 'User 2' 808 has different roles (Loan Process Manager (R3) and Supervisor (R2)) in the two different processes 804, 806. Both processes 804, 806 generate user behavior information 180 including structured data and unstructured communication data 184 as users 802, 808 perform their roles R1, R2 and R3 respectively. Work data 180, 184 coming from both processes 804, 806 is used to create user profile object $188_{U1}$ for User 1 802 and user profile object $188_{U2}$ for User 2 808 in context of the user's respective roles, workloads, and textual communications. The user profiles $188_{U1}$ and $188_{U2}$ are then stored in a local repository 190 which includes API 702 for interfacing with the user profiles stored at the repository. Thus, FIG. 8A shows two different processes which are running at the same bank and being used by the same employees of the bank but for different purposes and different roles. Additional details of the bank approval process 804 are illustrated in FIG. 8B, and additional details of the leave approval process 506 are illustrated in FIG. 8C.

FIG. 8B illustrates the bank loan approval process 804, running inside the same bank B1 800 where internal clients of the bank apply for financial loans. The process 804 has activities marked A1 to A8, roles 'loan applicant' (R1), 'bank clerk' (R2) and 'loan process manager' (R3) and text based comments T1 to T7 along with mail communication M1. In other words, an additional user (U3) 810 to the example illustrated in FIG. 8A wants to apply for a loan in the bank B1 800. U3 810 initiates the loan application process and is assigned the role of a loan applicant (R1) in the system. U3 810 fills in the details required for the loan in the activity A1, writes comments as text (T1) related to why s/he needs the loan and submits the form. In activity A2, the bank clerk U1 802 needs to check and validate the documents and mark the process for the approval of the bank manager U2 808. For this process, U1 802 is assigned role R2 (bank clerk). U1 802 validates the documents and enters comments T2 and the process moves forward to the approval activity. In activity A3, the supervisor of R2, i.e. user 2 (U2) 808 gets a notification for the pending loan approval. U2 808 enters the system and is assigned role R3 (loan process manager). Now, U2 808 can make one of two decisions, Path 1 or Path 2. In Path 1, U2 808 just approves the loan request, writes some comments T4, and the process is completed with sending a loan approval mail notification to U3 810. In Path 2, U2 808 writes up a comment as text T3 and asks for more details from U1 802. U2 808 may choose Path 2 for various reasons, such as if extra internal details are needed which may be necessary for the governance of the bank B1 800. Now U1 802 with role R2 of 'bank clerk' writes a mail M1 to the applicant U3 810, which may ask for additional documents or request an appointment for a telephonic call. U3 810 in role R1 of 'loan applicant' provides the documents (e.g., uploads the documents) and may enter some comments T5. At this level, two outcomes of the process are possible. The first outcome is an approval mail notification with textual comments T7. The second outcome is a rejection mail notification with reasons for rejection in textual comments T6. The process illustrated in FIG. 8B may run for any number of bank loan customers, such as 1, 10, 100, or 1000 or more, at various locations in the bank B1 800. Using the exemplary human communication retrieval component of the exemplary monitoring systems disclosed herein, all the textual data Ti=T1, T2, T3, T4, T5, T6, T7, . . . Tn, and mail data Mi=M1, . . . , Mi can be retrieved, along with user behavior information retrieved from the HTMCA component, and fed into the profile analysis engine for user profiling.

FIG. 8C illustrates the vacation leave approval process 806 for internal employees to apply for vacations, running inside the same bank B1 800 as in FIGS. 8A and 8B. Process 806 has activities marked from A1 to A7, Roles R1 and R2 and possible text based comments T1 to T6. User U1 802, wants to apply for a vacation for one week to spend time with visiting family. U1 802 starts the leave application process and is assigned the role of a vacation leave applicant (R1). U1 802 fills in the necessary details for activity A1, writes comments as text (T1) related to 'why U1 802 wants to take leave' and submits the form. U2 808 gets a notification for the pending leave approval activity. U2 808 logs into the system and is assigned the role of supervisor (R2). This assignment can already be defined on the basis of organizational hierarchy, etc. Now, U2 808 can make one of two decisions, Path 1 OR Path 2. In Path 1, U2 808 approves the request and may write some comment, T2. This completes the process with sending an approval mail notification to U1 802. In Path 2, U2 808 writes up a comment as text T3 and asks for details from U1 802. U2 808 might want more details for the vacation, depending on circumstances (e.g., high workload in the office or customer meetings requiring that U1 802 be in the office during those days) or personal working style. In such a scenario, U1 802 as the vacation leave applicant (R1) provides the reasons as comments T4. At this level there could be one of two outcomes. The first outcome is an approval notification with textual comments T6. The second outcome is a rejection notification with textual comments T5. Using the exemplary human communication retrieval component of the exemplary monitoring systems disclosed herein, all the textual data Ti=T1, T2, T3, T4, T5, T6, . . . Tn can be retrieved, along with user behavior information retrieved from the HTMCA component, and fed into the profile analysis engine for user profiling.

The comments from users U1 802 and U2 808 for the two different processes 804, 806 illustrated in FIGS. 8B and 8C, respectively, are representative of the communication data captured and retrieved by the exemplary HCRC disclosed herein (shown as 150 in FIGS. 1 and 150 in FIG. 3). The way users U1 802 and U2 808 work on the activities in the different business processes is representative of the user behavior information retrieved by the exemplary HTMCA component disclosed herein (shown as 148 in FIGS. 1 and 148 in FIG. 3). All of the information can be received upon request by the exemplary PAE disclosed herein (shown as 144 in FIGS. 1 and 144 in FIG. 3) to create a user profile for each of the users.

Referring to FIG. 8B, the information which is received would be received by the PAE is considered in view of four plausible text comments for T3 in FIG. 8B. These text comments are representative of the communication data that would be retrieved by the exemplary HCRC disclosed herein. User U2 808, acting in the role of loan process manager R3, asks the user U1 802 acting in the role of bank clerk R2 for more information from user U3 810 acting in the role of loan applicant R3. Four possible comments include:

(I) "Provide more information"
(II) "Can you provide more information please?"
(III) "Can you provide more financial supporting information for the loan application #4815162342"

(IV) "Hi Tom, can you provide more financial supporting information for the loan application #4815162342 when you get a chance, but ideally by the end of the day. Thanks. John"

In comment (I), a very straightforward, simply formulated request for more information is presented. The language used is very functional, indicating that that the comment is being treated as simply part of the process or a purely logical request. Based on this comment, then, the exemplary PAE may classify U2 into a personality attribute of 'straightforward,' for example. In comment (II), the same request is presented, but phrased in a more natural way, which brings a more human approach as opposed to a strict process oriented approach. This suggests that if U2 808 in role R3 made comment (ii), U2 may value human relationship more compared with making comment (i). Based on this comment, then, the exemplary PAE may classify U2 into a personality attribute of 'interpersonal,' for example.

In comment (III), additional context is presented, including the loan application number which supports interpretation of the request by U1 802 in role R2. The inclusion of context, such as the communication in comment (iii), can be as described in Nowson, et al., "Weblogs, Genres and Individual Differences" Proc. 27th Annual Conf. of the Cognitive Science Society (2005), to relate to high levels of the personality trait of agreeableness, which, in this instance, shows the need to help others understand. Accordingly, the exemplary PAE may classify U2 into a personality attribute of 'agreeable,' based on this comment. As part of a formal process, however, comment (iii) may be seen as redundant, which could indicate somewhat lower conscientiousness due to U2 808 in role R3 taking time to add information which is not needed.

In comment (IV), a natural extension of the social dimensions of language is added compared to comment (I) and comment (II). This level of language use implies higher levels of extraversion, the personality trait most related to the expression of human relationships. Accordingly, the exemplary PAE may classify U2 into a personality attribute of 'extrovert' based on comment (IV). In addition, the communication in comment (IV) can be considered in a situation where T3 may also be directly between U2 808 in the role R3 as loan manager and U3 810 in the role of loan applicant R1. Such communications can be analyzed to observe if, for example, U2 808 in role R3 uses different language when the communication T3 is between U1 802 in an internal role (R2) or U3 810 in an external role (R1) interlocutor.

Similarly, for instance, it may also be possible that U2 808 could have different behavior and communication patterns for the two different processes 804, 806. This may be due to personality or due to workload, as U2 808 may have several employees under his/her supervision and may have other roles in the bank.

Furthermore, in addition to the communication data retrieved from the exemplary HCRC, the HTMCA will provide additional user behavior information to the PAE which suggests work pattern based on the context of role and work load. For example, when U2 808 has multiple vacation approval tasks 806 coming at unknown times, does the user complete them as they come in, or set aside a set time (e.g., once a day, once a week) to do all such tasks. As a further example, how does the U2 808 behave when multiple loan approval tasks 804 are coming in at unknown times? Such information may suggest different work patterns for a given user depending on whether the task or activity is related to revenue generation or related to internal employee happiness. These work patterns from the user behavior information can advantageously be mapped to personality attributes through the exemplary PAE's usage of communication data received from the HCRC.

One aspect of the exemplary user profiling system and method and its operation in conjunction with the HCRC, PAE, and corresponding framework is that it provides an ability to combine the data generated from a business process related to user actions, such as user communication and user working styles, and already existing corporate user profile to create more detailed user profiles. While most existing business processes monitoring systems focus on classical monitoring, i.e., monitoring execution data such as start time, average execution time, etc., the exemplary method includes retrieving the user behavior information and textual communication data to automatically create or enrich user profiles. The user profiling capability of the present system and method can help to create a "user pool" having specific characteristics that are usually defined by an organization for different purposes.

Other aspects of the present method for user profiling is that it may be utilized by both internal users/agents and external clients of a business process. For example, with respect to internal users/agents, user profiling can be used to help in team collaboration through increased understanding of different behaviors in the team, communication styles, and working styles; team creation through identifying users with similar behavioral patterns and communication styles; and human resource management including candidate selection for different leadership roles or for finding the next best replacement for a given role. The exemplary user profiling system may also be utilized to aid in creating profiles of people that may be hazardous to an organization, such as people with fraud history or people who display carelessness and need additional trainings. In another aspect, the exemplary user profiling system can be utilized to enable users to perform self-evaluation and self-management of their own performance in the context of the processes they are involved in. The profiling may be used to identify, for example, communication weaknesses so that users can seek professional training for specific matters. The evaluation of communication style may also identify weaknesses in a given task and suggest alternative ways in which comments may be expressed to produce more desirable outcomes. In another aspect, the exemplary system and method can provide a positive impact on all employees, and in particular, a positive impact on new employees or new managers who are still in the learning process and are growing in terms of their job profiles.

With respect to external clients, one aspect of the exemplary user profiling is that it can be used to aid in customer management, including providing customer loyalty rewards; customer care at call center and virtual agent levels; risk assessments; and targeted marketing. Another aspect is in customer modelling, especially where a customer has interests in different domains (e.g., the same customer has different need for house insurance, medical insurance, loans, etc., all from the same entity). Customer profiling would give insight in to customer behavior, such as response time, and the like; and focused marketing, such as helping to form a recommendation system.

Additional aspects of the present method for user profiling provide further advantages in monitoring and profiling capability for organizations using collaborative business processes that involve various users from within and outside an organization. For example, people working within large organizations may come from different geographies and cultural backgrounds. Thus, access to the exemplary detailed user profiles can make it possible for people from different backgrounds to more easily understand and adapt to each other's work patterns more effectively. For example a person from one place may have a different work style or communication style to that of a person from another. Thus, the language, work style, communication style, domain expertise, experience level, etc. and the like, for various people working on a process may be different, which can be determined on a context-by-context basis.

Further aspects of the present method for user profiling provide the advantage of recognizing that, while humans are still a crucial component of every organization, humans still have peculiar behaviors which may lead to failures in the eyes of the organization. Humans may be very good at forming impressions of one another and changing responses based on the impressions they form. However, in text-based communication, there is minimal extra-linguistic information (e.g., tone of voice, facial expressions, body language) upon which one can form an impression. Similarly, people involved in these processes and collaborating with each other remotely may have no other face-to-face opportunity to witness this extra-linguistic information, compared to more local collaborators. Thus, by being able to share automatically generated profiles with other users, improved communication and reduction of the potential for misunderstandings between users is supported.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented user profiling system comprising:
   a first remote computing system which provides access to a business process management system that implements a business process; and
   a main computing system comprising:
      a profile analysis engine;
      a business process monitoring component which monitors data generated by the business process management system and alerts the profile analysis engine that a given business process is being implemented by the business process management system for the profile analysis engine to begin user profiling;
      a communication retrieval component which, for an entity employing the business process management system, captures communication data in real-time in response to the alert that a given business process is being implemented by the business process management system, the communication retrieval component retrieving communication data generated from users completing at least one activity in the given business process;
      a task monitoring and contextual analysis component which retrieves behavior information generated from users completing the activity in the given business process;
      wherein the profile analysis engine receives the retrieved communication data and behavior information and generates a user profile which corresponds to at least one of the users completing the activity in the given business process and is based on the retrieved communication data and behavior information, wherein the user profile identifies one or more attitudes of the at least one user which is at least partially based on textual data in the retrieved communication data;
      a features extraction component which performs natural language processing on the retrieved communication data to extract relevant terms, extracts textual features from the natural language processed communication data, and generates a textual features vector based on the textual features, the textual features including word-level features or class-based features;
      a trained attribute classifier which receives the textual features vector and predicts personality attribute labels for the at least one user based on the textual features vector; and
      a processor which implements the communication retrieval component, the task monitoring and contextual analysis component, the profile analysis engine, the features extraction component, and the trained attribute classifier.

2. The system of claim 1, wherein the textual data in the retrieved communication data includes language used by the at least one user during the business process.

3. The system of claim 1, wherein the retrieved communication data includes textual data external to the business process.

4. The system of claim 1, wherein the user profile accessible to the profile analysis engine is stored in a first repository, and user profiles accessible to a profile analysis engine of at least one other entity employing the business process management system are stored in a second repository, separate from the first repository.

5. The system of claim 4, further comprising a central repository communicatively connected to the first and second repositories which maintains copies of the user profiles stored in the first and second repositories.

6. The user-profiling system of claim 1, wherein the profile analysis engine generates a set of the personality attribute labels for the at least one user based on the communication data.

7. The system of claim 1, wherein the personality attribute labels are each associated with an attribute, the attributes include at least one of the group consisting of extraversion, emotional stability, conscientiousness, agreeableness, openness, Myers-Briggs Type indicators, and social styles values.

8. The system of claim 1, wherein the behavior information retrieved by the task monitoring and contextual analysis component includes, for the business process, details on data selected from the group consisting of:
   execution of the at least one activity, including name, start time, and end time of the activity;
   the one or more users of the entity employing the business process management system, including identification of users involved in the business process, the at least one activity being worked on by the users, and role of the users;
   execution of the business process; and
   a combination thereof.

9. The system of claim 1, wherein the associated business process management system implements the business process as a first business process and implements a second business process including at least one activity, and the communication retrieval component retrieves communication data associated with the first business process and communication data associated with the second business process.

10. The system of claim 1, wherein the user profile identifies one or more preferences of the at least one user completing the at least one activity of the business process, the one or more preferences being at least partially based on work patterns in the behavior information.

11. The system of claim 1, wherein the extraction of textual features comprises natural language processing of the retrieved communication data.

12. A computer-implemented method of user profiling comprising:
monitoring a business process of a business process management system employed by users of an entity;
retrieving communication data in real-time for at least one of the users completing an activity in the monitored business process;
receiving behavior information for the at least one user completing the activity in the monitored business process;
identifying one or more attitudes of the at least one user completing the activity in the monitored business process based at least partially on textual data in the retrieved communication data;
performing natural language processing on the retrieved communication data to extract relevant terms, the relevant terms including noun phrases and names of entities;
extracting textual features from the natural language processed communication data;
outputting a textual features vector based on the communication data;
predicting values correlated to one or more personality attributes based on the textual features vector;
classifying the communication data into one or more personality attribute classes corresponding to the one or more personality attributes based on the predicted values;
and
generating a user profile corresponding to the at least one user based on the communication data, behavior information, and personality attribute classes, the user profile including the one or more identified attitudes of the at least one user,
wherein at least one of the monitoring, retrieving, receiving, identifying, and generating is performed with a computer processor.

13. The method of claim 12, wherein the textual data in the communication data includes language used during the business process which may be exchanged between the at least one user of the business process and the behavior information includes data corresponding to execution of the activities of the business process which may be performed by the users.

14. The method of claim 12, further comprising:
storing the user profiles at a first location corresponding to the entity employing the business process management system;
storing the user profiles at a second location corresponding to a second entity employing the business process management system;
syncing the user profiles stored at the first and second location to a central location; and,
updating the user profiles synced to the central location based on the retrieved communication data of the first and second location.

15. The method of claim 12, further comprising:
receiving a pre-existing user profile corresponding to the at least one user; and,
generating the user profile corresponding to the at least one user, based on the communication data.

16. The method of claim 12, further comprising storing the real-time communication data in memory and collating the real-time communication data over a period of time.

17. A non-transitory computer readable medium storing instructions, which when executed by a computer processor, performs the method of claim 12.

18. A system comprising memory which stores instructions for performing the method of claim 12 and a processor in communication with the memory for executing the instructions.

19. The method of claim 12, further comprising identifying one or more preferences of the at least one user completing the monitored business process based at least partially on work patterns in the behavior information.

20. A computer-implemented user profiling system comprising:
a first remote computing system which provides access to a business process management system that implements a business process; and
a main computing system comprising:
a profile analysis engine which includes a features extraction component and a trained attribute classifier, the profile analysis engine being communicatively connected to a communication retrieval component and also being communicatively connected to a task monitoring and contextual analysis component, each of the profile analysis engine, the communication retrieval component, and the task monitoring and contextual analysis component being communicatively connected to a monitoring component of the business process management system;
wherein in response to a given business process being implemented by the business process management system, the monitoring component alerts the profile analysis engine, the task monitoring and contextual analysis component captures behavior information associated with at least one activity of the business process, and the communication retrieval component captures communication data associated with the at least one activity in real-time;
wherein in response to receiving the behavior information from the task monitoring and contextual analysis component and the communication data from the communication retrieval component, the features extraction component of the profile analysis engine performs natural language processing on the retrieved communication data to extract relevant terms, the relevant terms including noun phrases and names of entities, extracts textual features from the natural language processed communication data, and generates a textual features vector based on the textual features, the trained attribute classifier receives the textual features vector and predicts personality attribute labels for the at least one user based on the textual features vector, and the profile analysis engine generates a user profile based on the behavior information and communication data;
wherein the user profile includes one or more attitudes of at least one of the users completing the at least one activity of the business process, the one or more attitudes being at least partially based on language used in the communication data by the at least one user;

wherein the user profile includes one or more preferences of the at least one user completing the at least one activity of the business process, the one or more preferences being at least partially based on work patterns in the behavior information;

wherein the user profile includes a set of the personality attribute labels for the at least one user completing the at least one activity of the business process and, a processor which implements the profile analysis engine, the task monitoring and contextual analysis component and the communication retrieval component.

* * * * *